United States Patent
Ghozlan et al.

(10) Patent No.: US 12,120,048 B2
(45) Date of Patent: Oct. 15, 2024

(54) REMOTE INTERFERENCE MANAGEMENT REFERENCE SIGNAL

(71) Applicant: Apple Inc., Cupertino, CA (US)

(72) Inventors: Hassan Ghozlan, Portland, OR (US); Qian Li, Beaverton, OR (US); Dawei Ying, Hillsboro, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 17/280,707

(22) PCT Filed: Sep. 23, 2019

(86) PCT No.: PCT/US2019/052361
§ 371 (c)(1),
(2) Date: Mar. 26, 2021

(87) PCT Pub. No.: WO2020/068625
PCT Pub. Date: Apr. 2, 2020

(65) Prior Publication Data
US 2021/0385035 A1 Dec. 9, 2021

Related U.S. Application Data

(60) Provisional application No. 62/739,098, filed on Sep. 28, 2018.

(51) Int. Cl.
*H04L 5/00* (2006.01)
*H04L 5/14* (2006.01)
(Continued)

(52) U.S. Cl.
CPC .............. *H04L 5/0048* (2013.01); *H04L 5/14* (2013.01); *H04L 27/2605* (2013.01); *H04W 72/0446* (2013.01)

(58) Field of Classification Search
CPC ..... H04L 5/0048; H04L 5/14; H04L 27/2605; H04L 5/0073; H04L 5/0085;
(Continued)

(56) References Cited

U.S. PATENT DOCUMENTS 9,001,641 B2 * 4/2015 Bertrand ............... H04L 25/022
370/314
10,305,649 B2 5/2019 Fang
(Continued)

FOREIGN PATENT DOCUMENTS

CN 103733583 A 4/2014
JP 2017-538354 A 12/2017
(Continued)

OTHER PUBLICATIONS

International Search Report and Written Opinion directed to related International Patent Application No. PCT/US2019/052361, mailed Jan. 10, 2020; 10 pages.
(Continued)

*Primary Examiner* — Hoang-Chuong Q Vu
(74) *Attorney, Agent, or Firm* — Sterne, Kessler, Goldstein & Fox P.L.L.C.

(57) ABSTRACT

Systems, apparatuses, methods, and computer-readable media are provided for Remote Interference Management (RIM) in wireless networks, including RIM reference signals (RIM-RS) transmitted to assist victim Radio Access Network (RAN) nodes to identify aggressor RAN nodes due to, for example, atmospheric ducting. The RIM-RS is also bandwidth-flexible in order to enable detection of the RIM-RS by aggressor RAN nodes with different bandwidth configurations. Other embodiments may be described and/or claimed.

20 Claims, 10 Drawing Sheets

(51) Int. Cl.
*H04L 27/26* (2006.01)
*H04W 72/04* (2023.01)
*H04W 72/0446* (2023.01)

(58) Field of Classification Search
CPC ............... H04L 5/0091; H04L 5/1469; H04L 27/26025; H04L 27/2607; H04L 27/261; H04W 72/0446; H04J 11/0056; H04J 13/0062
See application file for complete search history.

(56) References Cited

U.S. PATENT DOCUMENTS

| | | | | |
|---|---|---|---|---|
| 2008/0089282 A1* | 4/2008 | Malladi | ............... | H04J 11/0069 370/329 |
| 2008/0311942 A1* | 12/2008 | Kim | ............... | H04L 5/0005 455/509 |
| 2016/0150570 A1* | 5/2016 | Wang | ............... | H04W 4/70 370/329 |
| 2016/0173248 A1* | 6/2016 | Kerhuel | ............... | H04L 1/20 370/328 |
| 2018/0109987 A1 | 4/2018 | Xu et al. | | |
| 2018/0234980 A1 | 8/2018 | Li et al. | | |
| 2021/0219304 A1* | 7/2021 | Xu | ............... | H04W 72/0446 |
| 2021/0234731 A1* | 7/2021 | Xu | ............... | H04W 72/27 |
| 2023/0143073 A1* | 5/2023 | Li | ............... | H04W 74/0866 370/329 |
| 2023/0239112 A1* | 7/2023 | Lee | ............... | H04L 27/2605 370/329 |

FOREIGN PATENT DOCUMENTS

| | | |
|---|---|---|
| KR | 10-1870275 B1 | 6/2018 |
| WO | WO 2018-175224 A1 | 9/2018 |

OTHER PUBLICATIONS

"Draft summary on Study on NR-RIM," R1-1809973, 3GPP TSG RAN WG1 Meeting #94, Aug. 20-24, 2018; 30 pages.
3GPP TS 38.211 V15.3.0, 3rd Generation Partnership Project; Technical Specification Group Radio Access Network; NR; Physical channels and modulation (Release 15), Sep. 2018; 96 pages.
3GPP TS 38.212 V15.1.1, 3rd Generation Partnership Project; Technical Specification Group Radio Access Network; NR; Multiplexing and channel coding (Release 15), Apr. 2018; 94 pages.
ZTE, "Consideration on reference signal design for remote interference management," 3GPP TSG RAN WG1 Meeting #94, R1-1808326, Gothenburg, Sweden, Aug. 20-24, 2018, 10 pages.
Office Action, dated Jan. 23, 2024, for Chinese Patent Appl. No. 201980063794.7, 10 pages including search report.

* cited by examiner

REMOTE INTERFERENCE MANAGEMENT REFERENCE SIGNAL

RELATED APPLICATIONS

The present application is a National Stage entry from PCT/US2019/052361 filed on Sep. 23, 2019, entitled "Remote Interference Management Reference Signal", which claims priority to U.S. Provisional App. No. 62/739,098, filed Sep. 28, 2018, both of which are incorporated herein by reference in their entireties.

FIELD

Various embodiments of the present application generally relate to the field of wireless communications, and in particular, to remote interference management (RIM) techniques.

BACKGROUND

In commercial Long Term Evolution (LTE) Time Division Duplex (TDD) networks with a relatively large amount of macrocell Radio Access Network (RAN) node (e.g., evolved NodeBs (eNBs)), Interference-Over-Thermal (I-o-T) at the eNBs was observed to intermittently deteriorate, which severely impacted network coverage and successful connection rate. I-o-T statistics from the RAN nodes in regions with forecasted troposphere bending, as well as the symptoms varying with the artificially constructed transmission patterns, showed that this kind of I-o-T degradation was caused by downlink (DL) signaling from remote RAN nodes as long as the atmospheric conditions were favorable for producing troposphere bending of radio waves. It is expected that NR TDD deployments may also suffer from atmospheric ducting interference.

Adaptive mechanisms can be used to mitigate the impact of this kind of remote interference without severely sacrificing network resources. Some of the adaptive mechanism involve victim being triggered to transmit a specific signal in a window in response to detecting abnormal I-o-T enhancements. Each RAN node that detects the specific signal in a window will identify itself as the contributor of the deteriorated I-o-T in some nodes, and then it may take some action, for example, reconfiguring a guard period (GP) or some other parameters to reduce its contribution to the interference.

DETAILED DESCRIPTION

Embodiments discussed herein provide techniques for Remote Interference Management (RIM) in wireless networks, including RIM reference signals (RIM-RS) transmitted to assist Radio Access Network (RAN) nodes to identify aggressors due to, for example, atmospheric ducting. The embodiments herein are also bandwidth-flexible in order to enable detection of the RIM-RS by RAN nodes with different bandwidth configurations. Other embodiments may be described and/or claimed.

Figure 1:
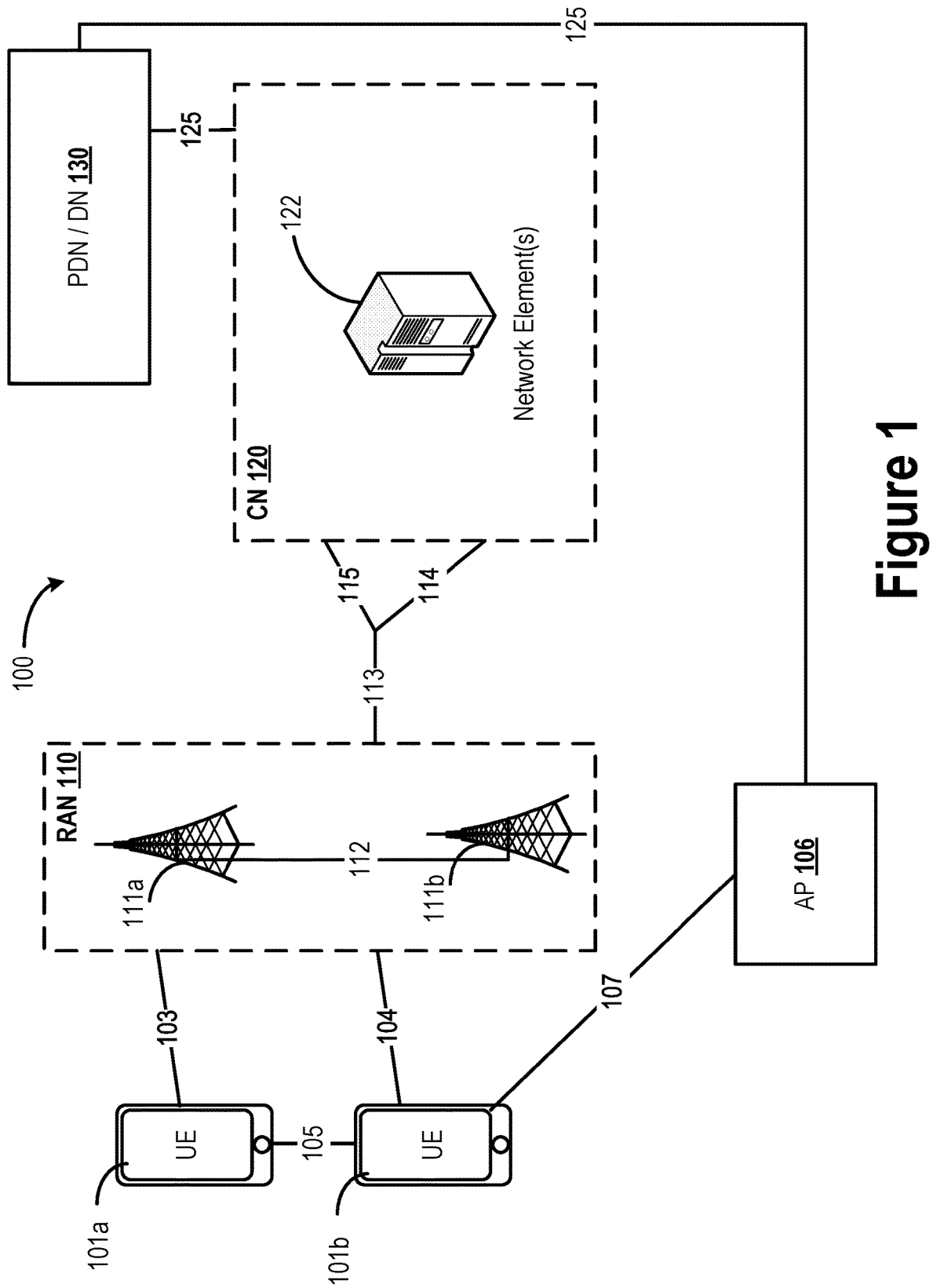
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the Fifth Generation (5G) or New Radio (NR) system standards or Long Term Evolution (LTE) system standards as provided by the Third Generation Partnership Project (3GPP) technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., Wireless Metropolitan Area Network (WMAN), Worldwide Interoperability for Microwave Access (WiMAX), etc.), or the like.

As shown by FIG. 1, the system 100 includes user equipment (UE) 101*a* and UE 101*b* (collectively referred to as "UEs 101" or "UE 101"). A UE 101 is any device with radio communication capabilities, such as a wireless communications interface, and describes a remote user of network resources in a communications network. In this example, UEs 101 are illustrated as smartphones, but may also comprise any mobile or non-mobile computing device, such as consumer tablet computers, wearable devices, desktop computers, laptop computers, in-vehicle infotainment (IVI) devices, head-up display (HUD) devices, Internet of Things (IoT) devices, embedded systems or microcontrollers, networked or "smart" appliances, and/or the like. The UEs 101 include various hardware elements such as baseband circuitry, memory circuitry, radiofrequency (RF) circuitry, and interface circuitry (e.g., input/output (I/O) interfaces), some or all of which may be coupled with one another via a suitable interconnect (IX) technology. The RF circuitry includes various hardware elements (e.g., switches, filters, amplifiers, digital signal processors (DSPs), etc.) configured to enable communication with wireless networks using modulated electromagnetic radiation through a non-solid medium. The electronic elements may be arranged as receive signal path (or receiving (Rx) RF chain) to down-convert received RF signals and provide baseband signals to the baseband circuitry, and arranged as a transmit signal path to up-convert baseband signals provided by the baseband circuitry and provide RF output signals to an antenna array via a front-end module for transmission. The baseband circuitry and RF circuitry allow the UEs 101 to connect or communicatively couple with a Radio Access Network (RAN) 110.

The UE 101b is shown to be configured to access an access point (AP) 106 via connection 107. The connection 107 can comprise a local wireless area network (WLAN) connection consistent with any IEEE 802.11 protocol, wherein the AP 106 may be a WiFi® router, gateway appliance, or the like. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or LTE/WLAN Radio Level Integration with IPsec Tunnel (LWIP) operation.

The RAN 110 is a set of RAN nodes 111 that implement a Radio Access Technology (RAT); the term "RAT" as used herein refers to a type of technology used for radio access such as NR, E-UTRA, WiFi/WLAN, and/or the like. The set of RAN nodes 111 in the RAN 110 are connected to one another via interface 112 and connected to the CN 120 through interface 113. In embodiments, the RAN 110 may be a Universal Terrestrial Radio Access Network (UTRAN) or Groupe Spécial Mobile (GSM)/Enhanced Datarates for GSM (EDGE) RAN (GERAN) when system 100 is an UTRAN or GERAN system, an Evolved UTRAN (E-UTRAN) when system 100 is an LTE or 4G system, or a next generation (NG) RAN or a 5G RAN when system 100 is an NR/5G system. The UEs 101 utilize connections (or channels) 103 and 104, respectively, each of which comprises a physical communications interface or layer. The term "channel" or "link" as used herein refers to any transmission medium, either tangible or intangible, which is used to communicate data or a data stream. Additionally, the term "link" as used herein refers to a connection between two devices through a RAT for the purpose of transmitting and receiving information. In FIG. 1, the connections 103 and 104 are illustrated as an air interface to enable communicative coupling, and can be consistent with cellular communications protocols, such as GSM, Code-Division Multiple Access (CDMA), Push-to-Talk (PTT) and/or PPT over cellular (POC), UMTS, LTE, 5G/NR, and/or the like. The UEs 101 may also directly exchange data via a Proximity Services (ProSe) or sidelink (SL) interface 105 comprising one or more physical and/or logical SL channels.

The RAN 110 includes one or more RAN nodes 111a and 111b (collectively referred to as "RAN nodes 111" or "RAN node 111") that enable the connections 103 and 104. The RAN nodes 111 are infrastructure equipment that provide the radio baseband functions for data and/or voice connectivity between a network (e.g., core network (CN) 120) and one or more users (e.g., UEs 101). The RAN nodes 111 can be referred to as NodeBs 111 in UMTS systems, evolved NodeBs (eNBs) 111 in LTE systems, next generation NodeBs (gNBs) 111 or next generation eNBs (ng-eNBs) in 5G/NR systems, Road Side Units (RSUs) for vehicle-to-everything (V2X) implementations, and so forth.

The RAN nodes 111 can comprise ground stations (e.g., terrestrial access points) or satellite stations providing coverage within a geographic area (e.g., a cell). The RAN nodes 111 may be implemented as one or more dedicated physical devices such as a macrocell base stations, and/or a low power base stations for providing femtocells, picocells, or other like cells having smaller coverage areas, smaller user capacity, or higher bandwidth (BW) compared to macrocells. Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some embodiments, all or parts of the RAN nodes 111 may be implemented as one or more software entities running on server computers as part of a virtual network (e.g., a cloud RAN (CRAN), virtual baseband unit pool (vBBUP), or the like). In these embodiments, the RAN nodes 111 may implement a RAN function split where different protocol entities are operated by different elements. The term "element" as used herein refers to a unit that is indivisible at a given level of abstraction and has a clearly defined boundary. One or more RAN nodes 111 may represent individual distributed units (DUs) that are connected to centralized unit (CU) via respective F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as a CRAN/vBBUP.

The RAN nodes 111 may be configured to communicate with one another via interface 112. The interface 112 may include a user plane interface for carrying user plane data between the RAN nodes 111, and a control plane interface for carrying control signaling between the RAN nodes 111. The interface 112 may be an X2 interface 112 when the system 100 is an LTE system, and the interface 112 may be an Xn interface 112 when the system 100 is a 5G/NR system. In some embodiments, interface 112 may be a wireless backhaul connection.

In embodiments, the UEs 101 can be configured to communicate using Orthogonal Frequency Division Multiplexing (OFDM) communication signals with each other or with any of the RAN nodes 111 over a multicarrier communication channel in accordance with various communication techniques, such as, but not limited to, an OFDMA communication technique (e.g., for DL communications) or a Single Carrier Frequency Division Multiple Access (SC-FDMA) communication technique (e.g., for UL and ProSe/SL communications), although the scope of the embodiments is not limited in this respect. The OFDM signals can comprise a plurality of orthogonal subcarriers.

DL and UL transmissions may be organized into frames with 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. There is one resource grid for a given antenna port p, subcarrier spacing (SCS) configuration μ, and transmission direction (DL or UL). The frequency location of a subcarrier refers to the center frequency of that subcarrier. Each element in the resource grid for antenna port p and SCS configuration μ is called a resource element (RE) and is uniquely identified by $(k,l)_{p,\mu}$ where k is the index in the frequency domain (e.g., k is a subcarrier index relative to a reference or reference point) and l refers to the symbol position in the time domain relative to some reference point (e.g., l is an OFDM symbol index relative to a reference or reference point). RE $(k,l)_{p,\mu}$ corresponds to a physical resource and the complex value $\alpha_{k,l}^{(p,\mu)}$. In other words, $\alpha_{k,l}^{(p,\mu)}$ is the value of RE (k, l) for antenna port p and SCS configuration μ. A collection of REs make up a resource block (RB), which is usually defined as $N_{sc}^{RB}=12$ consecutive subcarriers in the frequency domain. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A bandwidth part (BWP) is a subset of contiguous common RBs for a given numerology $\mu_i$ in BWP i on a given carrier. The UE 101 can be configured with up to four BWPs in the DL with a single downlink BWP being active at a given time. The UE 101 is not expected to receive PDSCH, PDCCH, or CSI-RS (except for RRM) outside an active BWP. The UE 101 can be configured with up to four BWPs in the UL with a single UL BWP being active at a given time. The UE 101 does not transmit PUSCH or PUCCH outside an active BWP. For an active cell, the UE 101 does not transmit SRS outside an active BWP.

There are several different physical channels and physical signals that are conveyed using RBs, Physical RBs (PRBs), and/or individual REs. A physical channel corresponds to a set of REs carrying information originating from higher layers. Physical channels include physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers. Physical signals include physical UL signals (e.g., Demodulation Reference Signal (DMRS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.). According to various embodiments, the physical DL signals and/or the physical UL signals further include the RIM-RS.

The PDSCH carries user data and higher-layer signaling to the UEs 101, and the PDCCH carries DL resource assignment information for receiving the PDSCH. Each UE 101 monitors a set of PDCCH candidates on one or more activated serving cells as configured by higher layer signaling for control information (e.g., Downlink Control Information (DCI)), where monitoring implies attempting to decode a set of PDCCH candidates according one or more monitored DCI formats (e.g., DCI formats 0 through 6-2 as discussed in section 5.3.3 of 3GPP TS 38.212 v15.1.1 (2018 April), DCI formats 0_0 through 2_3 as discussed in section 7.3 of 3GPP TS 38.212 v15.1.1 (2018 April), or the like). The DCI includes, inter alia, DL assignments and/or UL scheduling grants including, for example, modulation and coding format, resource allocation, and HARQ information, among other information/commands. Each UE 101 monitors (or attempts to decode) respective sets of PDCCH candidates in one or more configured monitoring occasions according to UE or cell-specific search spaces (for LTE systems), or monitors (or attempts to decode) respective sets of PDCCH candidates in one or more configured monitoring occasions in one or more configured Control Resource Sets (CORESETs) according to corresponding search space configurations (for NR/5G systems).

The RAN 110 is shown to be communicatively coupled to a core network (CN) 120 comprising one or more network elements 122, which are configured to offer various data and telecommunications services to customers/subscribers (e.g., users of UEs 101) who are connected to the CN 120 via the RAN 110. The term "network element" as used herein refers to physical or virtualized equipment and/or infrastructure used to provide wired or wireless communication network services, and may be considered synonymous with, and/or referred to as, a networked computer, networking hardware, network equipment, network node, router, switch, hub, bridge, radio network controller (RNC), RAN device, RAN node, gateway, server, cloud node, Virtualized Network Function (VNF), NFV Infrastructure (NFVI), and/or the like. The network elements 122 may be one or more server computer systems, which may implement various CN elements (e.g., network functions (NFs) and/or application functions (AFs)) such as those discussed herein. The components of the CN 120 may be implemented in one physical node or separate physical nodes including components to read and execute instructions from a machine-readable or computer-readable medium (e.g., anon-transitory machine-readable storage medium). In some embodiments, Network Function Virtualization (NFV) may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. As used herein, the terms "instantiate," "instantiation," and the like refers to the creation of an instance, and an "instance" refers to a concrete occurrence of an object, which may occur, for example, during execution of program code. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more NFs/AFs.

In embodiments where the CN 120 is an Evolved Packet Core (EPC) in LTE systems, the one or more network elements 122 may include or operate one or more Mobility Management Entities (MMEs), Serving Gateways (S-GWs), PDN Gateways (P-GWs), Home Subscriber Servers (HSSs), Policy Control and Charging Rules Functions (PCRFs), and/or other like LTE CN elements. In these embodiments, the E-UTRAN 110 may be connected with the EPC 120 via an S1 interface 113. In these embodiments, the S1 interface 113 is split into two parts: an S1-U interface 114 to carry traffic data between the RAN nodes 111 and the S-GW, and the S1-MME interface 115, which is a signaling interface between the RAN nodes 111 and MMEs. Additionally, the P-GW within the EPC 120 may route data packets between the EPC 120 and external networks such as a network including a Packet Data Network (PDN) 130 via an Internet Protocol (IP) interface 125. The PDN 130 may be an operator external public, a private PDN (e.g., enterprise network, cloud computing service, etc.), or an intra-operator PDN (e.g., for provision of IMS and/or IP-CAN services).

In embodiments where the CN 120 is a 5GC 120, the network elements 122 may implement one or more instances of an Authentication Server Function (AUSF), Access and Mobility Management Function (AMF), Session Management Function (SMF), Network Exposure Function (NEF), Policy Control Function (PCF), NF Repository Function (NRF), Unified Data Management (UDM) entity, AF, User Plane Function (UPF), Short Message Service Function (SMSF), Non-3GPP Interworking Function (N3IWF), Network Slice Selection Function (NSSF), and/or other like NR NFs. In such embodiments, the NG-RAN 110 may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a data network (DN) 130 via an IP interface 125. The DN 130 may represent one or more DNs including one or more Local Area DNs (LADNs), and may be an operator external public, a private PDN, an intra-operator PDN as discussed previously.

The CN 120 is shown to be communicatively coupled to PDN/DN 130 via an IP communications interface 125. The PDN/DN 130 may include one or more application servers (AS). The application server(s) (and the network element(s) 122) comprise one or more physical and/or virtualized systems for providing functionality (or services) to one or more clients (e.g., UEs 101) over a network. Such servers may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Generally, the ass) 130 offer applications or services that use IP/network resources. As examples, the server(s) may provide traffic management services, cloud computing services, content streaming services, immersive gaming experiences, social networking and/or microblogging services, one or more communication services (e.g., VoIP sessions, PTT sessions, group communication sessions, social networking services, etc.), and/or other like services for the UEs 101 via the CN 120.

Remote interference has been observed in commercial Time Division Duplex (TDD)-LTE networks with macrocell deployments where a relatively large number of eNBs intermittently suffered from deteriorating Interference-Over-Thermal (I-o-T), with values higher than −105 dBm, which severely impacts network coverage and successful connection rate. This kind of I-o-T degradation is caused by the downlink (DL) signaling of remote eNBs as far as 300 km away due to atmospheric ducting. Atmospheric ducting is a mode of propagation of electromagnetic radiation, usually in the lower layers of Earth's atmosphere, where the waves are bent by atmospheric refraction. An example of this phenomenon is illustrated by atmospheric duct scenario 200B of FIG. 2. An atmospheric duct is a horizontal layer in the lower atmosphere in which the vertical refractive index gradients are such that radio signals are guided or ducted, tend to follow the curvature of the Earth, and experience less attenuation in the ducts than they would if the ducts (e.g., a higher refractive index layer) were not present. The duct acts as an atmospheric dielectric waveguide and limits the spread of the wavefront to only the horizontal dimension. Atmospheric duct interference (ADI) is often referred to as "remote interference,"

Figure 2:
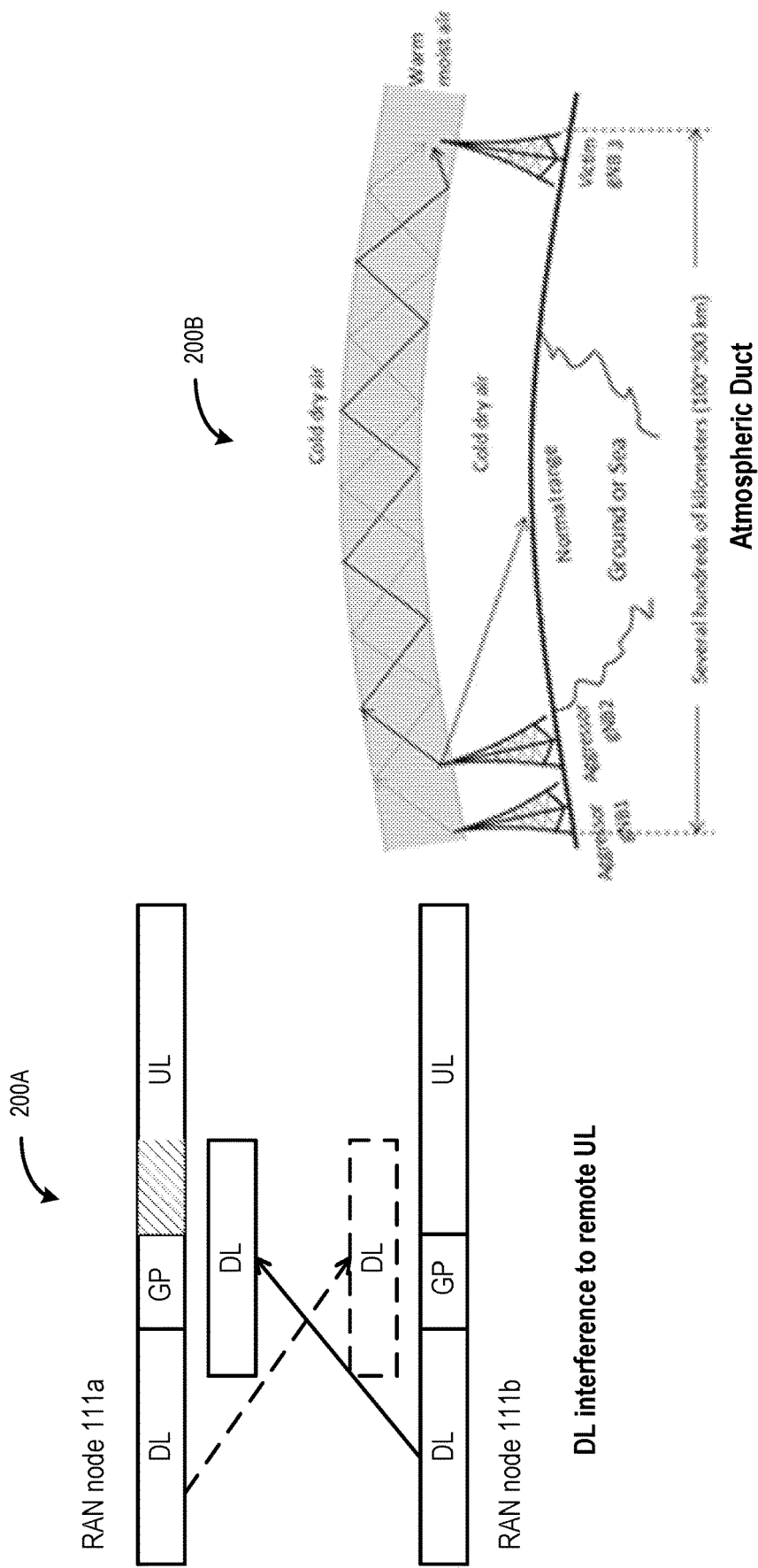
FIG. 2 illustrates an example scenario of atmospheric ducting with respect to embodiments of the present disclosure.

RIM is used to alleviate the degradation suffered by the uplink (UL) channel due to remote interference caused by a remote DL channel, as is shown by scenario 200A of FIG. 2. For RIM schemes in which aggressors take some mitigation action, the aggressors need to be identified. Here, an "aggressor" refers to a network element (e.g., RAN node 111a) that interferes with another network element (e.g., RAN node 111b); the network element that is interfered with by an aggressor (e.g., RAN node 111b) is referred to as a "victim" or the like. To this end, embodiments include a reference signal (referred to as a RIM reference signal (RIM-RS)), which is used by a RAN node 111 (e.g., gNB) to measure inter-cell interference and to provide information about the experienced interference to other RAN nodes 111 (e.g., gNB). In embodiments, the RIM-RS is transmitted by the victim to assist aggressor(s) to recognize that they are causing remote interference to the victim. The RIM-RS can also be used by the aggressor(s) to estimate how many UL resources of the victim are impacted by the aggressor(s). As discussed in more detail infra, various embodiments of the RIM-RS are provided to accommodate different available BWs for different RAN nodes 111. According to various embodiments, up to two different types of RIM-RS can be configured including a first RIM-RS type (hereinafter referred to as "RIM-RS type 1") that can be used to convey information, and a second RIM-RS type (hereinafter referred to as "RIM-RS type 2") that depends on configuration only. Details regarding the reference sequence structure, time and frequency pattern, BW, and multiplexing of the RIM-RS are discussed infra.

Figure 3:
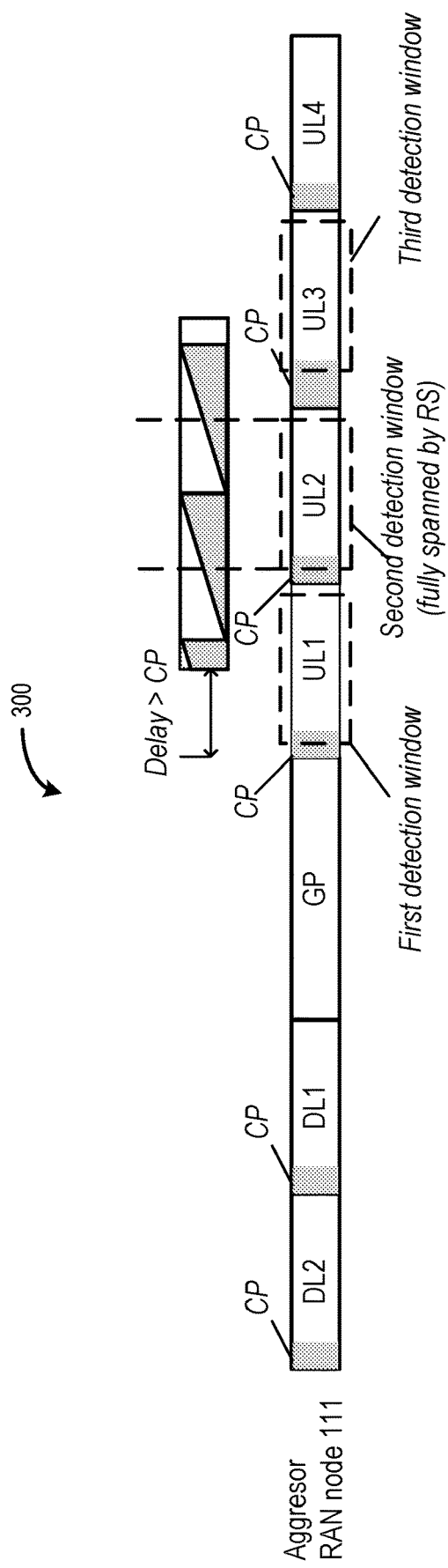
FIG. 3 illustrates an example Remote Interference Management Reference Signal (RIM-RS) structure according to various embodiments.

FIG. 3 shows an example RIM-RS structure 300 according to various embodiments. In various embodiments, the RIM-RS 300 includes a cyclic prefix (CP), multiple repetitions of a base time-domain sequence, and a gap period (GP) (sometimes referred to as a "guard period").

As the inter-RAN node 111 channel in RIM scenarios is usually a single path channel, a normal CP may be used. For example, the CP may be 4.7 μs for a 15 kHz SCS (see e.g., table 1 infra), or the CP may be 9.4 μs for a 15 kHz SCS or some other SCS. In the example of FIG. 3, the sequence is repeated twice and the total length of the RS is two symbols. In some embodiments, the base sequence may be slightly shorter than one symbol to provide enough room for the CP to be included in the symbol. For a detection window size equal to one symbol, the structure of the RIM-RS 300 insures that there is at least one detection window at the receiver that is fully spanned by the RS regardless of the delay. This RIM-RS structure 300 reduces detection complexity at the receiver because it requires cross-correlation on the symbol level and avoids performing cross-correlation at the sample level. The SCS for RIM-RS can be either the same as DL SCS or a fixed SCS independent of the DL SCS may be used.

Figure 4:
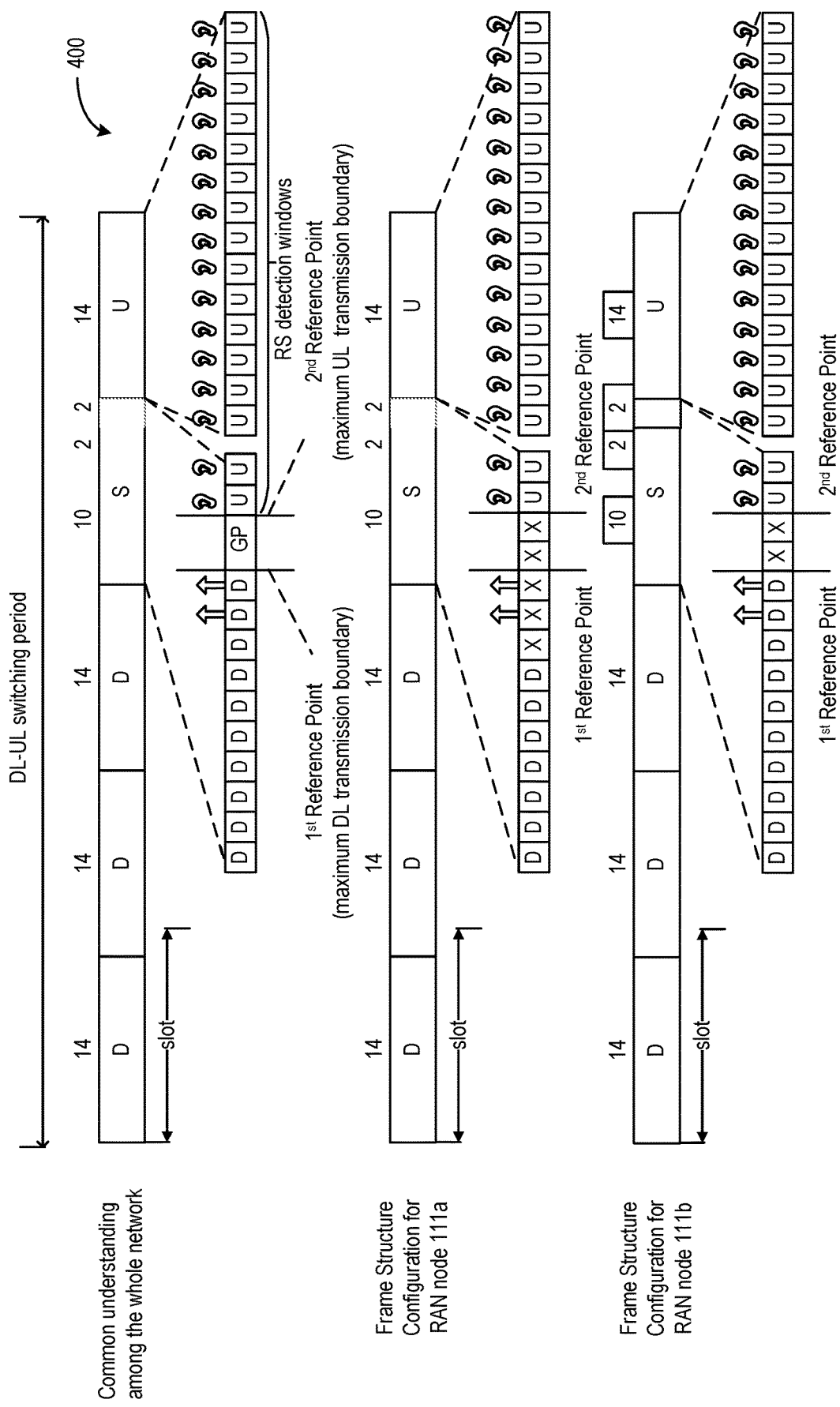
FIG. 4 illustrates an example of first and second reference points for RIM-RS time and frequency resource allocation according to various embodiments.

FIG. 4 shows a RIM-RS time and frequency resource allocation 400 according to various embodiments. In FIG. 4, resources labeled "D" are resources used for DL transmissions, and resources labelled with "U" refer to resources used for UL transmissions. In this example, each RAN node 111 has a DL boundary and a UL boundary. The DL boundary is a boundary between the DL time domain resources and the guard period (GP), and the UL boundary is a boundary between the GP and the UL time domain resources. In some embodiments, the GP for the RIM-RS may be different than the GP between the DL and UL in a TDD DL/UL period. The RAN nodes 111 (e.g., macrocell gNBs) in the network (e.g., system 100 of FIG. 1) are synchronized and have a common understanding regarding DL transmission boundaries and UL transmission boundaries, which indicate the ending boundary of a corresponding DL transmission and a corresponding UL transmission, respectively. The common understanding for the DL transmission boundaries is that the 1st Reference point is the maximum/latest DL boundary across RAN nodes 111 in the network, and the common understanding for the UL transmission boundaries is that the 2nd Reference Point is the minimum/earliest UL boundary across all RAN nodes 111 in the network. In FIG. 4, the UL boundaries happen to coincide, however in other implementations, the UL boundaries may not be in alignment. In some embodiments, the CP may be 4.7 μs for a 15 kHz SCS. In other embodiments, the CP is twice as much, for example, 9.4 for a 15 kHz SCS.

For the resource mapping of RIM-RS in the time domain, the RIM-RS location is fixed to be right before the 1st reference point in FIG. 4. This provides a fixed time reference for estimating the propagation delay between the aggressor RAN node 111a and the victim RAN nodes 111b, and estimating the number of semi-static UL symbols at the victim RAN node 111b that suffers from remote interference because of the aggressor RAN node 111a. Additionally, the RIM-RS can be mapped to consecutive subcarriers in the frequency domain.

With respect to RIM-RS BW length, because the RAN nodes 111 may be capable of operating a different BWs, the RIM-RS could be designed to fit the minimum system BW (e.g., 5 MHz) or designed to be configurable to accommodate different BW scenarios. Embodiments related to these different BW lengths are discussed infra with respect to FIG. 5.

Figure 5:
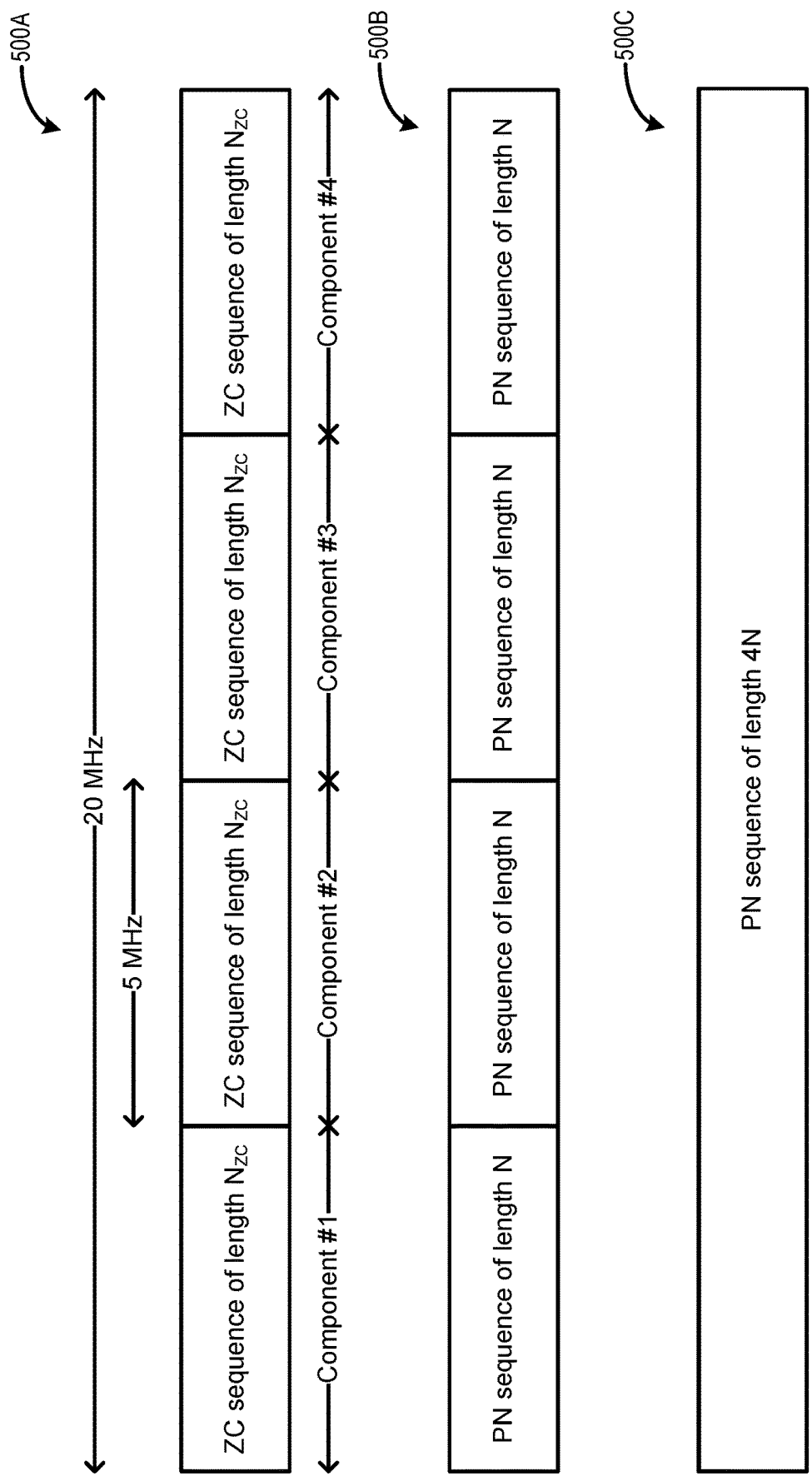
FIG. 5 illustrates an example RIM-RS sequence lengths and frequency multiplexing according to various embodiments.

FIG. 5 illustrates example RIM-RS sequence length and frequency multiplexing embodiments including Zadoff-Chu (ZC) sequences and pseudo-noise (PN) sequences (also referred to as "pseudo-random sequences" or the like). For RIM-RS 500A based on ZC sequences, a victim RAN node 111b constructs the RIM-RS 500A by multiplexing, in the frequency domain, multiple component sequences where each component sequence is a ZC sequence that has a length such that the ZC sequence fits within the minimum system BW. In some embodiments, the minimum system BW is 5 MHz. In some embodiments, each component (frequency domain) sequence (e.g., each ZC sequence) may be transformed into a corresponding time domain sequence.

In the ZC sequence embodiments, a component sequence of length $N_{ZC}$ and root index $u \in \{1, \ldots, N_{ZC}-1\}$ is given by:

$$x_u(n) = \exp\left(-\frac{j\pi un(n+1)}{N_{ZC}}\right)$$

where $n=0, \ldots, N_{ZC}-1$, u is the root index, and the length $N_{ZC}$ is the largest prime number such that the sequence fits into the minimum system BW (see e.g., section 5.2.2.1 of 3GPP TS 38.211 v15.3.0 (2019 September) (hereinafter "TS 38.211")). Additionally, j is an imaginary unit/number such as the square root of −1 (e.g., $\sqrt{-1}$). For example, for 5 MHz minimum BW and 30 kHz SCS, there are 5000/30=166 subcarriers, and therefore, $N_{ZC}$ is chosen to be 127 and RIM-RS 500A may have 4 components as is shown by FIG. 5. In some embodiments, all of the component sequences can have the same root index. In other embodiments, some or all of the component sequences may have distinct root indexes according to some pre-determined rule or value.

In these embodiments, if an aggressor has a smaller BW than the transmitted victim RIM-RS, the aggressor only uses the component sequences that fall within its BW to detect the transmitted RIM-RS.

There are two embodiments for RIM-RS based on PN sequences. In a first PN sequence embodiment, the victim RAN node 111b constructs an RIM-RS 500B by multiplexing, in the frequency domain, multiple component sequences where each component sequence is a Quadrature Phase Shift Keying (QPSK)-modulated sequence $r_L(n)$, defined infra, such that the length L fits within the minimum system BW. For example, for 20 MHz available BW, 5 MHz minimum BW and 30 kHz SCS, there are 5000/30=166 subcarriers in the minimum BW, and therefore, L can be chosen to be 128 and 4 component sequences can be used as is shown by RIM-RS 500B in FIG. 5.

In the second PN sequence embodiment, the victim RAN node 111 constructs a single RIM-RS 500C using the largest length of the QPSK-modulated sequence $r_L(n)$ that fits within its available BW. For example, for a 20 MHz available BW and 30 kHz SCS, there are 20000/30=666 subcarriers and the length L can be chosen to be 512.

For either PN sequence embodiment, the reference signal (e.g., RIM-RS) sequence $r_L(n)$ of length L is given by:

$$r(n) = \frac{1}{\sqrt{2}}(1 - 2 \cdot c(2n)) + j\frac{1}{\sqrt{2}}(1 - 2 \cdot (2n+1))$$

where $r(n)=r_L(n)$ and the PN sequence c(n) is an order-31 (or length-31) Gold sequence of length $M_{PN}$, where $n=0, 1, \ldots, M_{PN}-1$, is defined by:

$c(n)=(x_1(n+N_C)+x_2(n+N_C))\mod 2$ $x_1(n+31)=(x_1(x_1(n+3)+x_1(n))\mod 2$ $x_2(n+31)=(x_2(n+3)+x_2(n+2)+x_2(n+1)+x_2(n))\mod 2$ where $N_C=1600$ and the first m-sequence $x_1(n)$ is initialized with $x_1(0)=1$, $x_1(n)=0$, $n=1, 2, \ldots, 30$. In this example, the "c(2n)" and "c(2n+1)" in the reference signal sequence equation may refer to the PN sequence c(n). The initialization of the second m-sequence $x_2(n)$ is denoted by $c_{init}=\Sigma_{i=0}^{30} x_2(i) \cdot 2^i$ with the value depending on the application of the sequence where $c_{init}$ is the initial condition or initial seed value for the second m-sequence $x_2(n)$. In embodiments, the initial condition (or application of the sequence) can be used to convey some information about the identity (ID) of the transmitter RAN node 111. In some embodiments, the length of the sequence $M_{PN}=2L$.

Alternatively for either PN sequence embodiment, the reference signal (e.g., RIM-RS) sequence r(m) is given by:

$$r(m) = \frac{1}{\sqrt{2}}(1 - 2c(2m)) + j\frac{1}{\sqrt{2}}(1 - 2c(2m+1))$$

where the pseudo-random sequence c(m) (e.g., the "c(2m)" and "c(2m+1)" in the above equation) is defined in clause 5.2.1 of TS 38.211, and the pseudo-random sequence generator is to be initialized with:

$c_{init}=(2^{10}f(n_t^{RIM})+n_{SCID})\mod 2^{31}$ where $n_{SCID}$ is a scrambling identity, where $n_{SCID} \in \{0, 1, \ldots, 2^{10}-1\}$ is obtained from an entry for resource index $i_s^{RIM}$ in a list of configured scrambling identities, which is discussed in more detail infra;

$f(n_t^{RIM}) = \sum_{i=0}^{20} 2^i \bar{c}(i)$ where the pseudo-random sequence $\bar{c}(i)$ is given by clause 5.2.1 of TS 38.211, initialized with $\bar{c}_{init}(i) = (\gamma n_t^{RIM} + \delta) \bmod 2^{31}$ where the multiplier factor $\gamma \in \{0, 1, \ldots, 2^{31}-1\}$ and the offset $\delta \in \{0, 1, \ldots, 2^{31}-1\}$; and
$n_t^{RIM} = \lfloor t_{RS}^{RIM} - t_{ref}^{RIM})/T_{per}^{RIM} \rfloor$ is the number of RIM-RS transmission periods since $t_{ref}^{RIM}$ where $t_{RS}^{RIM} - t_{ref}^{RIM}$ is the time in seconds relative to $t_{ref}^{RIM}$ of 00:00:00 on 1 Jan. 1900, calculated as continuous time without leap second and traceable to a common time reference, and
$T_{per}^{RIM} = N_{slot}^{P_t}/(1000 \cdot 2^\mu)$ is the RIM-RS transmission periodicity in seconds assuming that the first RIM-RS transmission period starts at $t_{ref}^{RIM}$, and where $N_{slot}^{P_t}$ is the total number of slots in a RIM-RS transmission period (as discussed infra).

For the first PN sequence embodiment, if an aggressor has a smaller BW than the transmitted victim RIM-RS, the aggressor only uses the component sequences that fall within its BW to detect the transmitted RIM-RS. For the second PN sequence embodiment, only the truncated portion of the sequence $r_L(n)$ (or $r(m)$) that fits within its BW is used to detect the transmitted RIM-RS.

Figure 6:
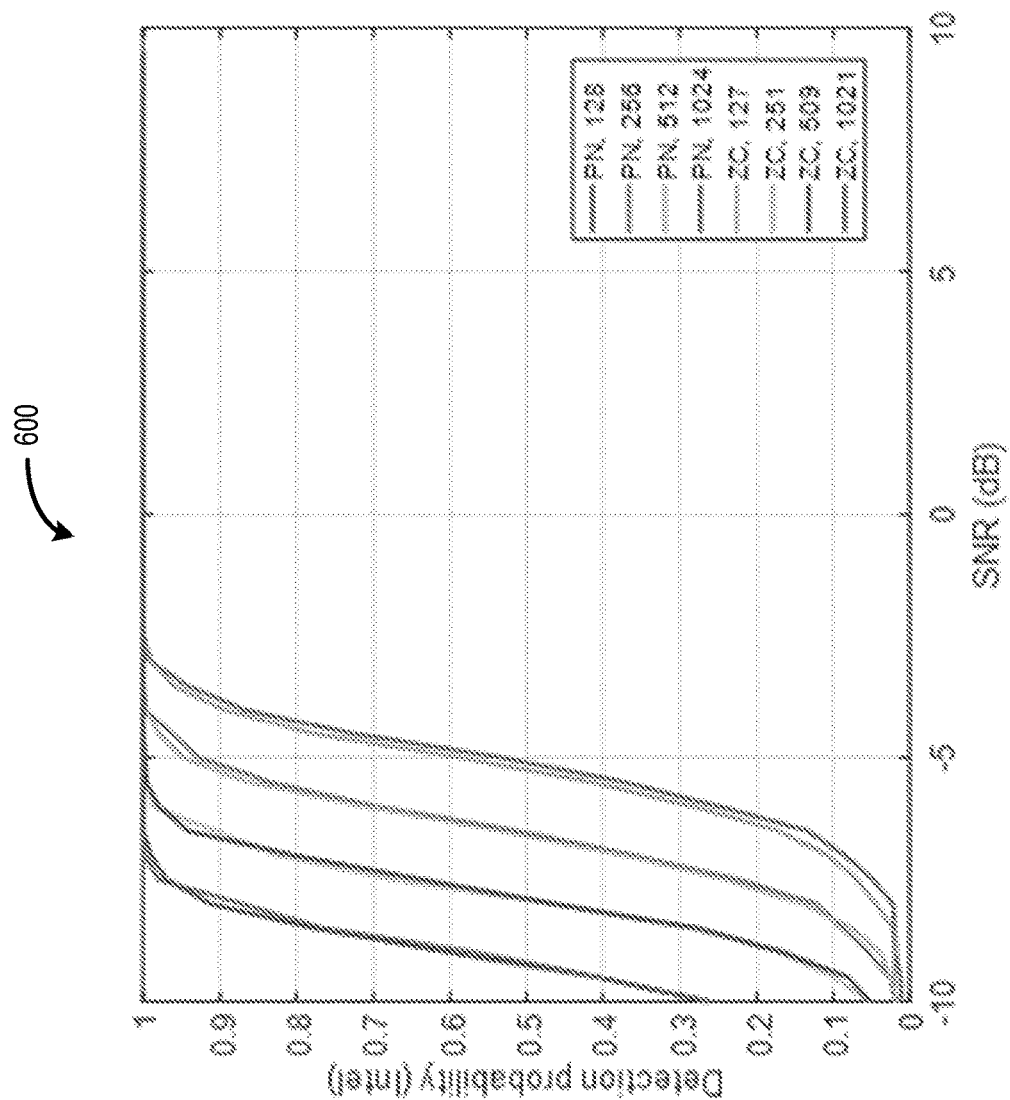
FIG. 6 shows performance results of the RIM-RS of different sequence lengths.

FIG. 6 shows performance results for the various RIM-RS embodiments described herein for a sample of different sequence lengths. The graph 600 of FIG. 6 shows a detection probability of RIM-RS with different sequences (see e.g., FIG. 5) versus signal-to-noise ratio (SNR).

Figure 7:
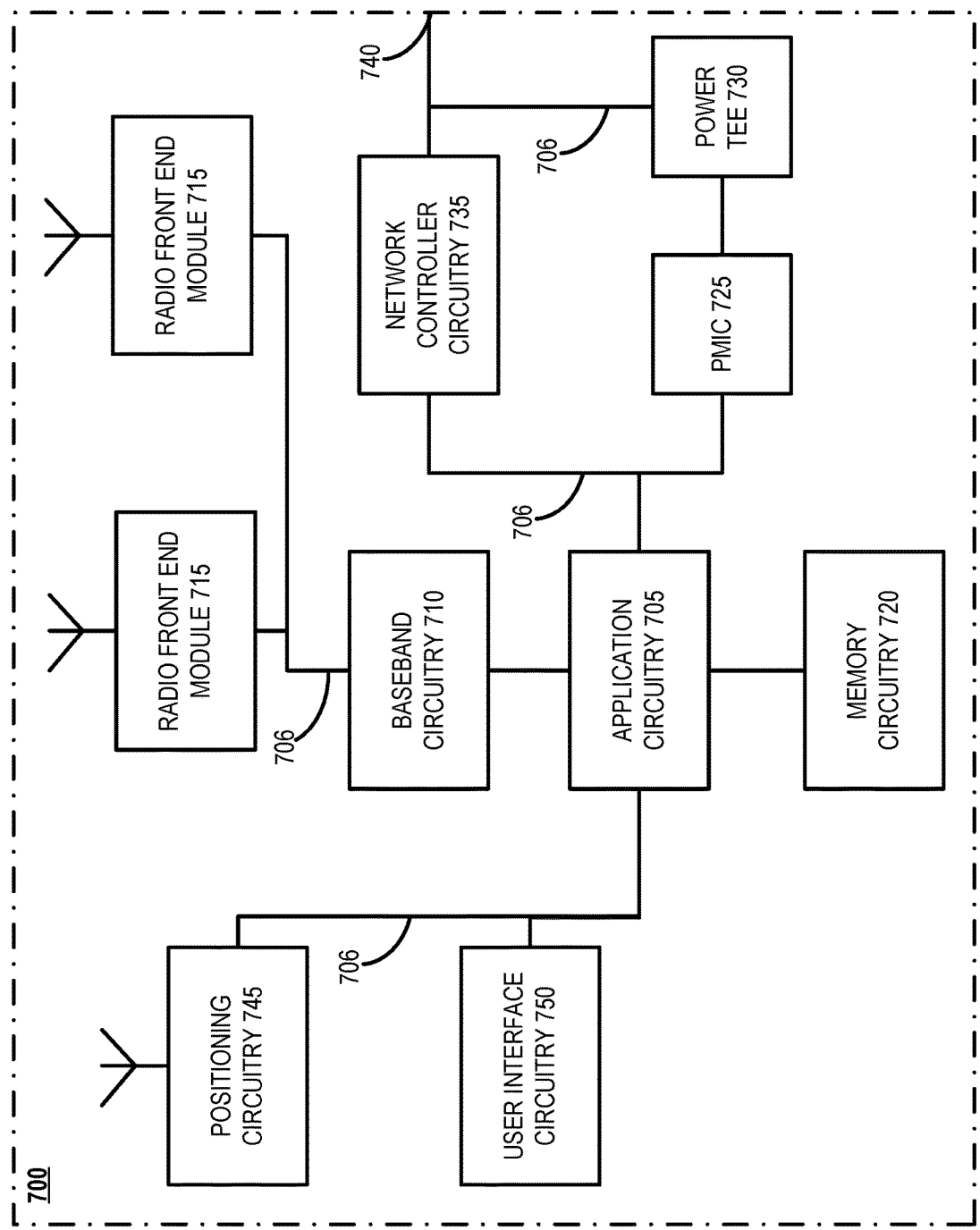
FIG. 7 illustrates an example of infrastructure equipment in accordance with various embodiments.
Figure 8:
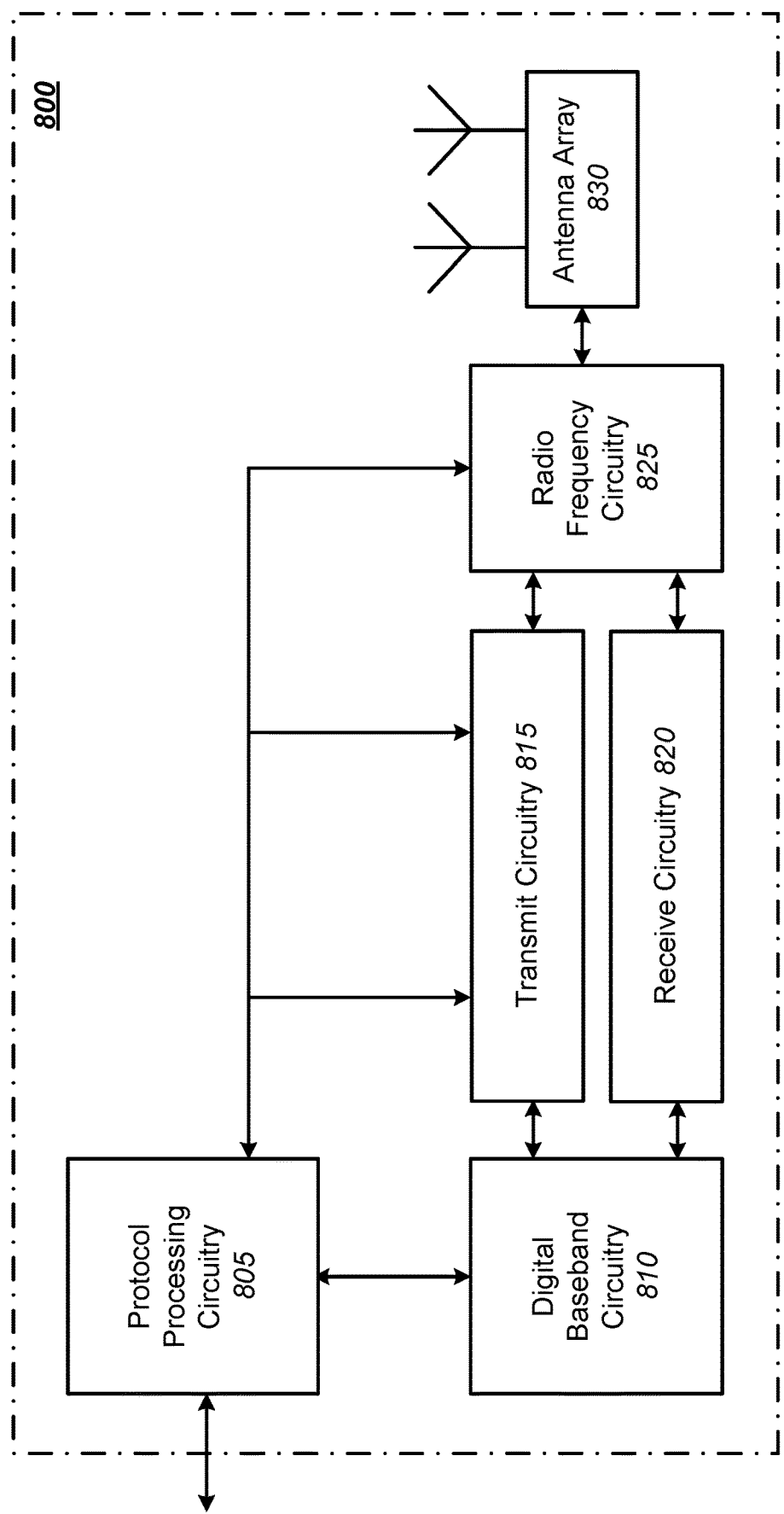
FIG. 8 illustrates an example of communication circuitry that may be used to practice the embodiments discussed herein.

Each of the UEs 101, RAN nodes 111, AP 106, network element(s) 122, application servers 130, and/or any other device or system discussed previously with respect to FIGS. 1-6 may include various hardware and/or software elements, such as those discussed infra with respect to FIGS. 7 and 8.

FIG. 7 illustrates an example of infrastructure equipment 700 in accordance with various embodiments. The infrastructure equipment 700 (or "system 700") may be implemented as a base station, radio head, RAN node such as the RAN nodes 111 and/or AP 106 shown and described previously, application server(s) 130, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. The term "circuitry" as used herein refers to a circuit or system of multiple circuits configured to perform a particular function in an electronic device. The circuit or system of circuits may be part of, or include one or more hardware components, such as logic circuits, processor(s) (shared, dedicated, or group) and/or memory (shared, dedicated, or group), Integrated Circuits (ICs), Application-specific ICs (ASICs), Field Programmable Gate Arrays (FPGAs), Digital Signal Processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data, and/or any other device capable of executing or otherwise operating computer-executable instructions, such as program code, software modules, and/or functional processes. As used herein, the term "module" refers to one or more independent electronic circuits packaged onto a circuit board, FPGA, ASIC, SoC, SiP, etc., configured to provide a basic function within a computer system. A "module" may include a processor circuitry (shared, dedicated, or group) and/or memory circuitry shared, dedicated, or group), etc., that execute one or more software or firmware programs, a combinational logic circuit, and/or other suitable components that provide the described functionality. As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

Application circuitry 705 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd.

such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The baseband circuitry 710 includes one or more processing devices (e.g., baseband processors) to carry out various protocol and radio control functions. Baseband circuitry 710 may interface with application circuitry of system 700 for generation and processing of baseband signals and for controlling operations of the RFEMs 715. The baseband circuitry 710 may handle various radio control functions that enable communication with one or more radio networks via the RFEMs 715. The baseband circuitry 710 may include circuitry such as, but not limited to, one or more single-core or multi-core processors (e.g., one or more baseband processors) or control logic to process baseband signals received from a receive signal path of the RFEMs 715, and to generate baseband signals to be provided to the RFEMs 715 via a transmit signal path. In various embodiments, the baseband circuitry 710 may implement a RTOS to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 111, etc.), or the like.

The components shown by FIG. 7 may communicate with one another using interface circuitry 706 or IX 706, which may include any number of bus and/or IX technologies such as Industry Standard Architecture (ISA), extended ISA, inter-integrated circuit (I²C), Serial Peripheral Interface (SPI), point-to-point interfaces, power management bus (PMBus), Peripheral Component Interconnect (PCI), PCI express (PCIe), PCI extended (PCIx), Intel® Ultra Path Interconnect (UPI), Intel® Accelerator Link (IAL), Coherent Accelerator Processor Interface (CAPI), OpenCAPI, Intel® QuickPath Interconnect (QPI), Intel® Omni-Path Architecture (OPA) IX, RapidIO™ system IXs, Cache Coherent Interconnect for Accelerators (CCIA), Gen-Z Consortium IXs, a HyperTransport interconnect, and/or any number of other IX technologies. The IX technology may be a proprietary bus, for example, used in an SoC based system.

FIG. 8 illustrates an example of communication circuitry 800 that may be used to practice the embodiments discussed herein. Components as shown by FIG. 8 are shown for illustrative purposes and may include other components not shown by FIG. 8, or the elements shown by FIG. 8 may by alternatively be grouped according to functions.

The communication circuitry 800 includes protocol processing circuitry 805, which operates or implements various protocol layers/entities of one or more wireless communication protocols. In one example, the protocol processing circuitry 805 may operate Long Term Evolution (LTE) protocol entities and/or Fifth Generation (5G)/New Radio (NR) protocol entities when the communication circuitry 800 is a cellular radiofrequency communication system, such as millimeter wave (mmWave) communication circuitry or some other suitable cellular communication circuitry. In this example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In another example, the protocol processing circuitry 805 may operate one or more IEEE-based protocols when the communication circuitry 800 is WiFi communication system. In this example, the protocol processing circuitry 805 would operate MAC and logical link control (LLC) functions.

The protocol processing circuitry 805 may include one or more memory structures (not shown) to store program code and data information for operating the protocol functions, as well as one or more processing cores (not shown) to execute the program code and perform various operations using the data information. The protocol processing circuitry 805 may include one or more instances of control circuitry (not shown) to provide control functions for the digital baseband circuitry 810, transmit circuitry 815, receive circuitry 820, and/or radiofrequency (RF) circuitry 825. In some embodiments, the protocol processing circuitry 805 and/or the baseband circuitry 810 correspond to the baseband circuitry 710 of FIG. 7.

The communication circuitry 800 also includes digital baseband circuitry 810, which implements physical layer (PHY) functions including hybrid automatic repeat request (HARQ) functions, scrambling and/or descrambling, (en) coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. The modulation/demodulation functionality may include Fast-Fourier Transform (FFT), precoding, or constellation mapping/demapping functionality. The encoding/decoding functionality may include convolution, tail-biting convolution, turbo, Viterbi, Low Density Parity Check (LDPC) coding, polar coding, etc. Embodiments of modulation/demodulation and encoder/decoder functionality are not limited to these examples and may include other suitable functionality in other embodiments.

Baseband processing circuitry 810 and/or protocol processing circuitry 805 may interface with an application platform (e.g., application circuitry 705 of FIG. 7) for generation and processing of baseband signals and for controlling operations of the RF circuitry 825. The digital baseband circuitry 810 may handle various radio control functions that enable communication with one or more radio networks via the RF circuitry 825. The digital baseband circuitry 810 may include circuitry such as, but not limited to, one or more single-core or multi-core processors (e.g., one or more baseband processors) or control logic to process baseband signals received from a receive signal path of the RF circuitry 825 (e.g., via Rx circuitry 820) and to generate baseband signals for a transmit signal path of the RF circuitry 825 (e.g., via Tx circuitry 815). The digital baseband circuitry 810 may comprise a multi-protocol baseband processor or the like.

As mentioned previously, the digital baseband circuitry 810 may include or implement encoder circuitry, which accepts input data, generates encoded data based on the input data, and outputs the encoded data to a modulation mapper. The encoder may also perform one or more of error detecting, error correcting, rate matching, and interleaving. The encoder may further include scrambling based on a scrambling sequence such as those discussed herein.

In various embodiments, the digital baseband circuitry 810 may include or implement a sequence generator to generate, for example, low Peak to Average Power Ratio (low-PAPR) sequences (see e.g., section 5.2.2 of TS 38.211), pseudo-random noise (PN) sequences (see e.g., section 5.2.1 of TS 38.211), and/or reference signal sequences. In some embodiments, the sequence generator may be a part of the encoder circuitry. PN sequences are made up of bits (e.g., 1s and 0s) that are supposed to be random. The PN sequence generator may include linear feedback shift registers (LSFR) to generate the PN sequences. Scrambling codes based on Gold codes are used to scramble physical signals prior to transmission. The Gold codes are obtained by combining two PN sequences and performing modulo-2 addition or performing an exclusive OR (XOR) operation on the PN sequences. In embodiments, the sequence generator is used for QPSK modulation uses a pseudo-random Gold sequence, $c(n)$, which is obtained by combining two M-sequences, $x_1$ and $x_2$, of length 31, as described previously. In embodiments, the sequence generator generates RIM-RS sequences including the ZC sequences and the PN sequences discussed previously.

In various embodiments, the digital baseband circuitry 810 may include or implement a modulation mapper that takes binary digits as input (e.g., the encoded data from the encoder) and produces complex-valued modulation symbols as an output. As an example, for QPSK modulation, pairs of bits, $b(2i)$, $b(2i+1)$, are mapped to complex-valued modulation symbols $d(i)$ according to:

$$d(i) = \frac{1}{\sqrt{2}}[(1 - 2b(2i)) + j(1 - 2b(2i + 1))]$$

The modulation mapper may operate any other suitable modulation scheme, such as those discussed by section 5.1 of TS 38.211. The modulation mapper may map groups containing one or more binary digits, selected from the encoded data, to complex valued modulation symbols according to one or more mapping tables.

In some embodiments, the complex-valued modulation symbols may be input to layer mapper to be mapped to one or more layer mapped modulation symbol streams. The one or more streams of layer mapped symbols may be input to precoder that generates one or more streams of precoded symbols, which may be represented as a block of vectors. The precoder may be configured to perform a direct mapping using a single antenna port, transmit diversity using space-time block coding, or spatial multiplexing. Each stream of precoded symbols may be input to a resource mapper that generates a stream of resource mapped symbols (e.g., resource elements). The resource mapper may map precoded symbols to frequency domain subcarriers and time domain symbols according to a mapping, which may include contiguous block mapping, randomized mapping, and/or sparse mapping according to a mapping code.

According to various embodiments, the modulation mapper (or resource mapper) maps the RIM-RS sequence to physical resources (also referred to as "RIM-RS resources"), which may occupy a number of resource blocks $N_{RB}^{RIM}$. In some embodiments, at most 32 RIM-RS resources can be configured within a 10 ms period. A resource for RIM-RS transmission is defined by resource indices including, a time resource index $i_t^{RIM}$, a frequency resource index $i_f^{RIM}$, and a sequence parameter resource index $i_s^{RIM}$, wherein $i_t^{RIM} \in \{0, 1, \ldots, P_t-1\}$, $i_f^{RIM} \in \{0, 1, \ldots, N_f^{RIM}-1\}$, and $i_s^{RIM} \in \{0, 1, \ldots, N_s^{RIM,i}-1\}$.

In various embodiments, the RIM-RS receiver assumes that the reference signal (e.g., the RIM-RS) being mapped to physical resources according to:

$$a_k^{(p,RIM)} = \beta_{RIM} r(k)$$

$$k = 0, 1, \ldots, L_{RIM} - 1$$

where $\beta_{RIM}$ is an amplitude scaling factor in order to control the RIM-RS transmission power and $p$ is the antenna port. The starting position $l_0$ for RIM-RS type $i \in \{1,2\}$ in slot $n_{s,f}^\mu$ in a frame is given by: $l_0 = T_{offset}^{UD,RIM} \bmod N_{symb}^{slot}$ in slots satisfying:

$$(1024 N_{slot}^{frame,\mu} \bar{n}_f^{RIM} + N_{slot}^{frame,\mu} n_f^{RIM} + n_{s,f}^\mu - (T_{offset} + \lfloor T_{offset}^{UD,RIM}/N_{symb}^{slot} \rfloor)) \bmod N_{slot}^{P_t} = 0$$

where $\bar{n}_f^{RIM} \in \{0, 1, \ldots, N_{slot}^{P_t}/(1024 N_{slot}^{frame,\mu})-1\}$ counts the number of times the SFN periods within the RIM-RS transmission period; $T_{offset}^{UD,RIM} = N_{ref}^{UD,RIM} - N_{symb,ref}^{RIM,i}$ where $N_{ref}^{UD,RIM} \in \{2, 3, \ldots, 20 \cdot 2 \cdot 14 - 1\}$ is the symbol offset of the reference point after the starting boundary of the uplink-downlink switching period in which the RIM-RS is mapped to, and $N_{symb,ref}^{RIM,i}$ is obtained as discussed herein; $N_{slot}^{P_t}$ is the total number of slots in a RIM-RS transmission period, and is discussed in more detail infra; $T_{offset}$ is the slot offset of the uplink-downlink switching period with index $i_t^{RIM}$ with respect to the starting boundary of the RIM-RS transmission period; and $P_t$ is the RIM-RS transmission periodicity in units of uplink-downlink switching period as discussed infra.

Regarding RIM-RS configuration, in general, a resource for an RIM-RS transmission is defined by the indices $i_t^{RIM} \in \{0, 1, \ldots, P_t-1\}$, $i_f^{RIM} \in \{0, 1, \ldots, N_f^{RIM}-1\}$, and $i_s^{RIM} \in \{0, 1, \ldots, N_s^{RIM,i}-1\}$ used as indices into configured lists of time, frequency, and sequence parameters, respectively. All RIM-RS resources occupy the same number of resource blocks, $N_{RB}^{RIM}$. In some embodiments, at most 32 RIM-RS resources can be configured within a 10 ms period.

With respect to time-domain parameters and mapping from $i_t$ to time-domain parameters, RIM-RS are transmitted periodically with the RIM-RS transmission period $P_t$ defined in units of the uplink-downlink switching period determined from one or two configured uplink-downlink periods.

If a single uplink-downlink period is configured for RIM-RS purposes, $P_t$ is the RIM-RS transmission periodicity in terms of uplink-downlink switching periods given by:

$$P_t = \left\lceil \frac{2^\mu \bar{P}_t T_{per,1}^{RIM}}{1024 N_{slot}^{frame,\mu}} \right\rceil \frac{1024 N_{slot}^{frame,\mu}}{2^\mu T_{per,1}^{RIM}}$$

where $T_{per,1}^{RIM} \in \{0.5, 0.625, 1, 1.25, 2, 2.5, 4, 5, 10, 20\}$ ms; $N_{slot}^{P_t} = 2^\mu P_t T_{per,1}^{RIM}$ is the total number of slots in a RIM-RS transmission period; and $T_{offset} = 2^\mu i_t^{RIM} T_{per}^{RIM}$ is the slot offset of the uplink-downlink switching period with index $i_t^{RIM}$ with respect to the starting boundary of the RIM-RS transmission period.

If two uplink-downlink periods are configured for RIM-RS purposes, $P_t$ is the RIM-RS transmission periodicity in terms of $P_t/2$ pairs of uplink-downlink switching periods and is given by $$P_t = \left\lceil \frac{2^\mu \bar{P}_t (T_{per,1}^{RIM} + T_{per,2}^{RIM})/2}{1024 N_{slot}^{frame,\mu}} \right\rceil \frac{1024 N_{slot}^{frame,\mu}}{2^\mu (T_{per,1}^{RIM} + T_{per,2}^{RIM})/2}$$

where each pair consists of a first period of $T_{per,1}^{RIM} \in \{0.5, 0.625, 1, 1.25, 2, 2.5, 3, 4, 5, 10, 20\}$ ms and a second period of $T_{per,2}^{RIM} \in \{0.5, 0.625, 1, 1.25, 2, 2.5, 3, 4, 5, 10\}$ ms and where $T_{per,1}^{RIM} + T_{per,2}^{RIM}$ divides 20 ms; $N_{slot}^{P_t} = 2^\mu P_t (T_{per,1}^{RIM} + T_{per,2}^{RIM})/2$ is the total number of slots in a RIM-RS transmission period; and $T_{offset} = 2^\mu \lfloor i_t^{RIM}/2 \rfloor (T_{per,1}^{RIM} + T_{per,2}^{RIM}) + 2^\mu (i_t^{RIM} \mod 2) T_{per,1}^{RIM}$ is the slot offset of the uplink-downlink switching period with index $i_t^{RIM}$ with respect to the starting boundary of the RIM-RS transmission period. The intermediate quantity $\bar{P}_t$ is given by:

$$\bar{P}_t = \begin{cases} \left\lceil \frac{N_{setID}^{RIM,1}}{N_f^{RIM} N_s^{RIM,1}} \right\rceil R_1 + \left\lceil \frac{N_{setID}^{RIM,2}}{N_f^{RIM} N_s^{RIM,2}} \right\rceil R_2 & \text{if } EnoughIndication \text{ is disabled} \\ \left\lceil \frac{2N_{setID}^{RIM,1}}{N_f^{RIM} N_s^{RIM,1}} \right\rceil R_1 + \left\lceil \frac{N_{setID}^{RIM,2}}{N_f^{RIM} N_s^{RIM,2}} \right\rceil R_2 & \text{if } EnoughIndication \text{ is enabled} \end{cases}$$

where $N_{setID}^{RIM,1}$ and $N_{setID}^{RIM,2}$ are the total number of setIDs for RIM-RS type 1 and RIM-RS type 2, respectively; $N_f^{RIM} \in \{1,2,4\}$ is the number of candidate frequency resources configured in the network; $N_s^{RIM} \in \{1, 2, \ldots, 8\}$ is the number of candidate sequences assigned for RIM-RS type $i \in \{1,2\}$ in the network; and $R_1$ and $R_2$ are the number of consecutive uplink-downlink switching periods for RIM-RS type 1 and RIM-RS type 2, respectively. If near-far functionality is not configured, $R_i \in \{1,2,4\}$, otherwise $R_i \in \{2,4,8\}$ and the first and second half of the $R_i$ consecutive uplink-downlink switching periods are for near functionality and far functionality, respectively.

The quantity $N_{symb,ref}^{RIM,i}$ is obtained from entry $\bar{r}$ in a list of configured symbol offsets for RIM-RS i.

For frequency-domain parameters and mapping from $i_f$ to frequency-domain parameters, the frequency-domain parameter $k_1$ in clause 5.3.3 of 3GPP TS 38.211 is the frequency offset relative to a configured reference point for RIM-RS and is obtained from entry $i_f^{RIM}$ in a list of configured frequency offsets expressed in units of resource blocks. The number of candidate frequency resources configured in the network, $N_f^{RIM}$, is to fulfill the following:

$$N_f^{RIM} \leq \left\lfloor \frac{N_{grid}^{size,\mu} N_{RB}^{sc} \cdot 2^\mu \cdot 15}{40 \cdot 10^3} \right\rfloor + \left\lfloor \frac{N_{grid}^{size,\mu} N_{RB}^{sc} \cdot 2^\mu \cdot 15}{80 \cdot 10^3} \right\rfloor + 1$$

where $N_{RB}^{sc}$ may be the number of subcarriers per resource block (e.g., $N_{RB}^{sc} = N_{sc}^{RB}$; see e.g., clause 4.4.4.1 of TS 38.211); and $N_{grid}^{size,\mu}$ is a carrier BW for SCS configuration $\mu$ given by the higher-layer parameter carrierBandwidth in the SCS-SpecificCarrier IE (see e.g., clauses 4.4.2 of TS 38.211). If $N_f^{RIM} > 1$, the frequency difference between any pair of configured frequency offsets in the list is not smaller than $N_{RB}^{RIM}$ (the number of RBs for RIM-RS). The number of RBs for RIM-RS is given by:

$$N_{RB}^{RIM} = \min(96, N_{grid,DL}^{size,\mu}) \text{ for } \mu=0$$

$$N_{RB}^{RIM} \in \{\min(48, N_{grid,DL}^{size,\mu}), \min(96, N_{grid,DL}^{size,\mu})\}$$
for $\mu=1$ where $N_{grid,DL}^{size,\mu}$ is the size of the DL resource grid (see e.g., clauses 4.4.2 and 5.3 of TS 38.211.

The sequence parameters and mapping from $i_s$ to sequence parameters involves obtaining the scrambling identity $n_{SCID}$ from entry $i_s^{RIM}$ in a list of configured scrambling identities.

Mapping between resource triplet and set ID involves determining the resource indices $i_t^{RIM}$, $i_f^{RIM}$, and $i_s^{RIM}$ from the index $\bar{r}$ in the set ID $n_{setID}$ according to:

$$i_t^{RIM} = T_{start} + \left( \left\lfloor \frac{n_{setID}}{N_s^{RIM}} \right\rfloor \mod N_t^{RIM} \right) R + \bar{r}$$

$$i_f^{RIM} = \left( \left\lfloor \frac{n_{setID}}{N_t^{RIM} N_s^{RIM}} \right\rfloor \mod N_f^{RIM} \right)$$

$$i_s^{RIM} = S_{start} + (n_{setID} \mod N_s^{RIM})$$

where $N_t^{RIM}$ is given by:

$$N_t^{RIM} = \begin{cases} \left\lceil \frac{N_{setID}^{RIM,1}}{N_f^{RIM} N_s^{RIM,1}} \right\rceil & \text{for } RIM\text{-}RS \text{ type 1 and if } EnoughIndication \text{ is disabled} \\ \left\lceil \frac{2N_{setID}^{RIM,1}}{N_f^{RIM} N_s^{RIM,1}} \right\rceil & \text{for } RIM\text{-}RS \text{ type 1 and if } EnoughIndication \text{ is enabled} \\ \left\lceil \frac{N_{setID}^{RIM,2}}{N_f^{RIM} N_s^{RIM,2}} \right\rceil & \text{for } RIM\text{-}RS \text{ type 2} \end{cases}$$

$N_f^{RIM} \in \{1,2,4\}$ is the number of candidate frequency resources configured in the network; $N_s^{RIM}$ is the number of sequence candidates for the current RIM-RS resource given by:

$$N_s^{RIM} = \begin{cases} N_s^{RIM,1} & \text{for } RIM\text{-}RS \text{ type 1 and if } EnoughIndication \text{ is disabled} \\ N_s^{RIM,1}/2 & \text{for } RIM\text{-}RS \text{ type 1 and if } EnoughIndication \text{ is enabled} \\ N_s^{RIM,2} & \text{for } RIM\text{-}RS \text{ type 2} \end{cases}$$

$T_{start}$ is the starting time offset given by:

$$T_{start} = \begin{cases} 0 & \text{for RIM-RS type 1} \\ \left\lceil \dfrac{N_{setID}^{RIM,1}}{N_f^{RIM} N_s^{RIM,1}} \right\rceil & \text{for RIM-RS type 2 and if EnoughIndication is disabled} \\ \left\lceil \dfrac{2N_{setID}^{RIM,1}}{N_f^{RIM} N_s^{RIM,2}} \right\rceil & \text{for RIM-RS type 2 and if EnoughIndication is enabled} \end{cases}$$

$s_{start}$ is given by:

$$S_{start} = \begin{cases} N_s^{RIM,1}/2 & \text{if EnoughIndication is enabled and 'enough mitigation' is to be indicated} \\ 0 & \text{otherwise} \end{cases}$$

where $N_s^{RIM,1}$ is the number of candidate sequences assigned for RIM-RS type 1; $\bar{r} \in \{0, 1, \ldots, R_i-1\}$ where $R_i$ is the number of consecutive uplink-downlink periods for RIM-RS type i as discussed elsewhere herein; and the set ID is determined from the resource triplet according to:

$$n_{setID} = (t_s^{RIM} - S_{start}) + N_s^{RIM} \left\lfloor \dfrac{i_t^{RIM} - T_{start}}{R_i} \right\rfloor + N_t^{RIM} N_s^{RIM} i_f^{RIM}$$

In various embodiments, the digital baseband circuitry 810 includes or implements a baseband signal generator (also referred to as a "multicarrier generator") to generate OFDM baseband signals and/or other like baseband signals. In these embodiments, the resource mapped symbols from the resource mapper are input to the baseband signal generator which generates time domain baseband symbol(s). The baseband signal generator may generate a time domain signal (e.g., a set of time domain symbols) using, for example, an inverse discrete Fourier transform, commonly implemented as an inverse fast Fourier transform (IFFT) or a filter bank comprising one or more filters. The time-domain signal that results from the IFFT is transmitted across the radio channel. At the receiver, an FFT block is used to process the received signal and bring it into the frequency domain which is used to recover the original data bits.

According to various embodiments, OFDM baseband signal generation for RIM-RS is as follows: The time-continuous signal $s_l^{(p,\mu)}(t)$ on antenna port p for RIM-RS is defined by:

$$s_l^{(p,\mu)}(t) = \sum_{k=0}^{L_{RIM}-1} a_k^{(p,RIM)} e^{j2\pi(k+k_1)\Delta f_{RIM}\left(t - N_{CP}^{RIM} T_c - t_{start,l_0}^{\mu}\right)}$$

where $t_{start,l_0}^{RIM} \leq t < t_{start,l_0}^{RIM} + (N_u^{RIM} + N_{CP}^{RIM})T_c$ $N_u^{RIM} = 2 \cdot 2048\kappa \cdot 2^{-\mu}$ $N_{CP}^{RIM} = N_{CP,l_0}^{RIM} + N_{CP,\bar{l}}^{RIM}$ $\bar{l} = \begin{cases} 0 & \text{if } l_0 = N_{symb}^{slot} - 1 \\ l_0 + 1 & \text{otherwise} \end{cases}$ and where $a_k^{(p,RIM)}$ is/are the resource mapped symbols, k is a subcarrier index, $\mu$ is the SCS configuration; $N_{symb}^{slot}$ is the number of symbols per slot; $\Delta f_{RIM}$ is the SCS for RIM-RS and $\Delta f_{RIM}=15 \cdot 2^\mu$ kHz where $\mu \in \{0,1\}$ is the SCS configuration for the RIM-RS (see e.g., table 1 infra); $k_1$ is the starting frequency offset of the RIM-RS as discussed elsewhere herein; $L_{RIM}=12N_{RB}^{RIM}$ is the length of the RIM-RS sequence where $N_{RB}^{RIM}$ is the BW of the RIM-RS in RBs; $l_0$ is the starting symbol and is discussed elsewhere herein; $t_{start,l_0}^{RIM}=t_{start,l}^{\mu}$ is given by clause 5.3.1 of TS 38.211 and is discussed elsewhere herein with $l=l_0$; and $N_{CP,l_0}^{RIM}=N_{CP,l}^{\mu}$ is given by clause 5.3.1 of TS 38.211 and discussed elsewhere herein with $l=l_0$ where $N_{CP,l}^{\mu}$ is the CP length for SCS configuration $\mu$ and OFDM symbol l, where $l \in \{0, 1, \ldots, N_{slot}^{subframe,\mu} N_{symb}^{slot} - 1\}$, and $$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal } \textit{cyclic} \text{ prefix, } l = 0 \text{ or } l = 7 \cdot 2^\mu \\ 144\kappa \cdot 2^{-\mu} & \text{normal cyclic prefix, } l \neq 0 \text{ or } l \neq 7 \cdot 2^\mu \end{cases}$$

The starting position of OFDM symbol l for SCS configuration $\mu$ in a subframe is given by $$t_{start,l}^{\mu} = \begin{cases} 0 & l = 0 \\ t_{start,l-1}^{\mu} + (N_u^{\mu} + N_{CP,l-1}^{\mu}) \cdot T_c & \text{otherwise} \end{cases} \text{ where } N_u^\mu = 2048\kappa \cdot 2^\mu.$$

TABLE 1

Supported transmission numerologies

| μ | Δf = $2^\mu$ · 15[kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

Multiple OFDM numerologies are supported as given by table 1 where Δf is the SCS, and where μ and the CP for a BWP are obtained from the higher-layer parameter subcarrierSpacing and cyclicPrefix, respectively. In table 1, the normal CP refers to a CP duration of 4.7 microseconds (μs) (or 5.2 μs) and seven symbols per slot, and the extended CP refers to a CP duration of 16.67 μs and 6 symbols per slot.

In various embodiments, the digital baseband circuitry 810 includes or implements RIM-RS detection circuitry, wherein the digital baseband circuitry 810 monitors (or attempts to detect) one or more RIM-RS candidates in one or more (pre)configured RIM-RS monitoring occasions. The RIM-RS monitoring occasions may be based on the RIM-RS time and frequency resource allocation 400 of FIG. 4, the RIM-RS resource mapping embodiments discussed previously, and/or the RIM-RS configuration embodiments discussed previously.

The communication circuitry 800 also includes transmit (Tx) circuitry 815 and receive (Rx) circuitry 820. The Tx circuitry 815 is configured to convert digital baseband signals into analog signals for transmission by the RF circuitry 825. To do so, in one embodiment, the Tx circuitry 815 includes various components, such as digital to analog converters (DACs), analog baseband circuitry, up-conversion circuitry, and filtering and amplification circuitry. In another embodiment, the Tx circuitry 815 may include digital transmit circuitry and output circuitry.

The Rx circuitry 820 is configured to convert analog signals received by the RF circuitry 825 into digital baseband signals to be provided to the digital baseband circuitry 810. To do so, in one embodiment, the Rx circuitry 820 includes parallel receive circuitry and/or one or more instances of combined receive circuitry. The parallel receive circuitry and instances of the combined receive circuitry may include Intermediate Frequency (IF) down-conversion circuitry, IF processing circuitry, baseband down-conversion circuitry, baseband processing circuitry, and analog-to-digital converter (ADC) circuitry.

The communication circuitry 800 also includes radiofrequency (RF) circuitry 825 to enable communication with wireless networks using modulated electromagnetic radiation through a non-solid medium. The RF circuitry 825 includes a receive signal path, which may include circuitry to convert analog RF signals (e.g., an existing or received modulated waveform) into digital baseband signals to be provided to the digital baseband circuitry 810 via the Rx circuitry 820. The RF circuitry 825 also includes a transmit signal path, which may include circuitry configured to convert digital baseband signals provided by the digital baseband circuitry 810 via the Tx circuitry 815 to be converted into analog RF signals (e.g., modulated waveform) that will be amplified and transmitted via the antenna array 830.

In various embodiments, RIM-RS modulation (e.g., provided by the RF circuitry 825) and up-conversion (e.g., provided by the Tx circuitry 815) to a carrier frequency $f_0$ of the complex-valued OFDM baseband signal for antenna port p, SCS configuration μ, and OFDM symbol l in a subframe assumed to start at t=0 is given by:

$$\mathrm{Re}\{s_l^{(p,\mu)}(t)e^{j2\pi f_o^{RIM}(t-t_{start,l_o}^{RIM}-N_{CP}^{RIM}T_c)}\}$$

where $f_0^{RIM}$ is the configured reference point for RIM-RS.

RF circuitry 825 may include one or more instances of radio chain circuitry, which may include one or more filters, power amplifiers, low noise amplifiers, programmable phase shifters, and power supplies (not shown). RF circuitry 825 may also include power combining and dividing circuitry. The power combining and dividing circuitry may operate bidirectionally, such that the same physical circuitry may be configured to operate as a power divider when the device is transmitting, and as a power combiner when the device is receiving. In some embodiments, the power combining and dividing circuitry may include wholly or partially separate circuitries to perform power dividing when the device is transmitting and power combining when the device is receiving. The power combining and dividing circuitry may include passive circuitry comprising one or more two-way power divider/combiners arranged in a tree. In some embodiments, the power combining and dividing circuitry may include active circuitry comprising amplifier circuits.

The communication circuitry 800 also includes antenna array 830. The antenna array 830 include one or more antenna elements. The antenna array 830 may be a plurality of microstrip antennas or printed antennas that are fabricated on the surface of one or more printed circuit boards. The antenna array 830 may be formed in as a patch of metal foil (e.g., a patch antenna) in a variety of shapes, and may be coupled with the RF circuitry 825 using metal transmission lines or the like.

Figure 9:
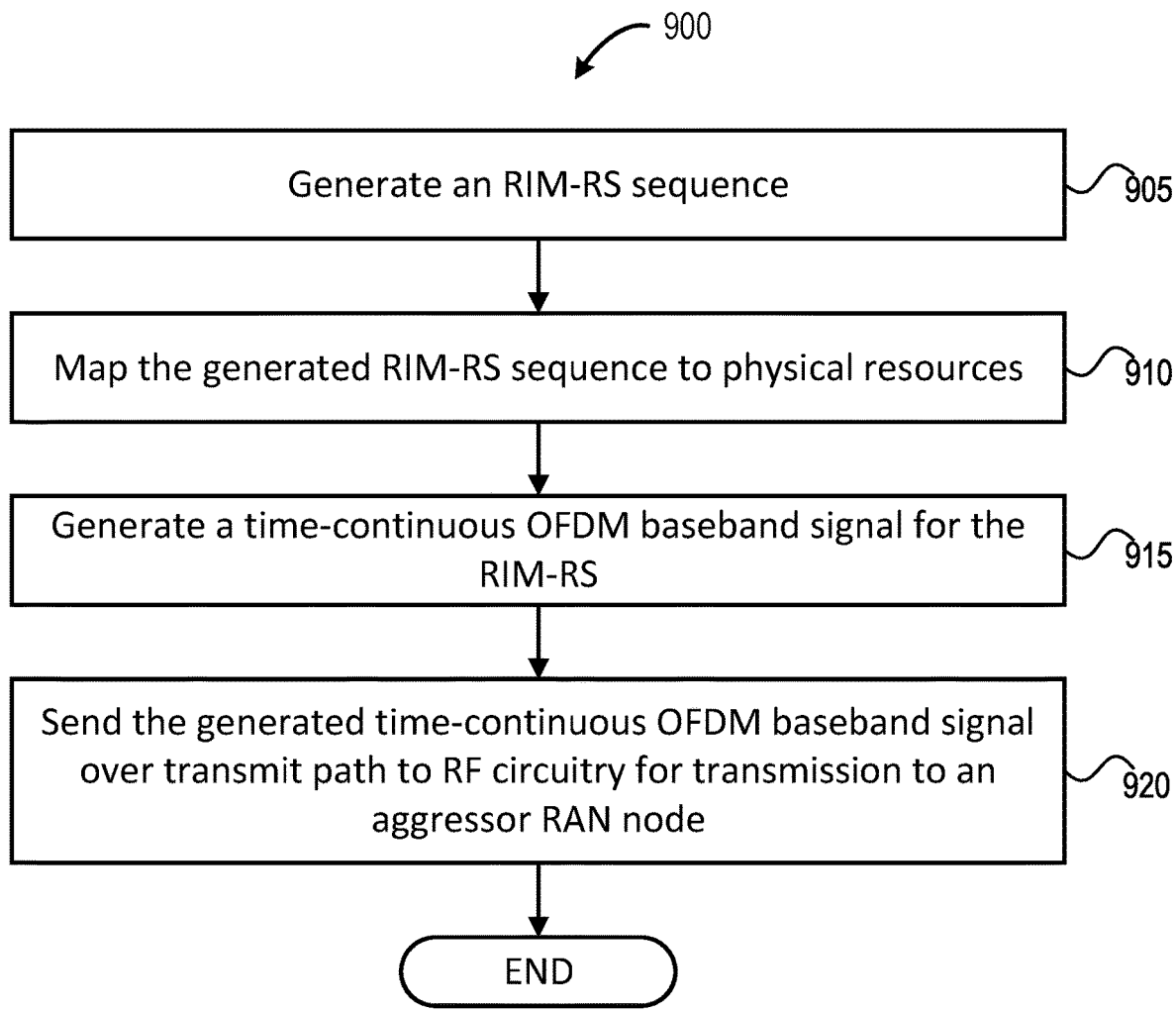
FIGS. 9-10 depict example processes for practicing the various embodiments discussed herein.
Figure 10:
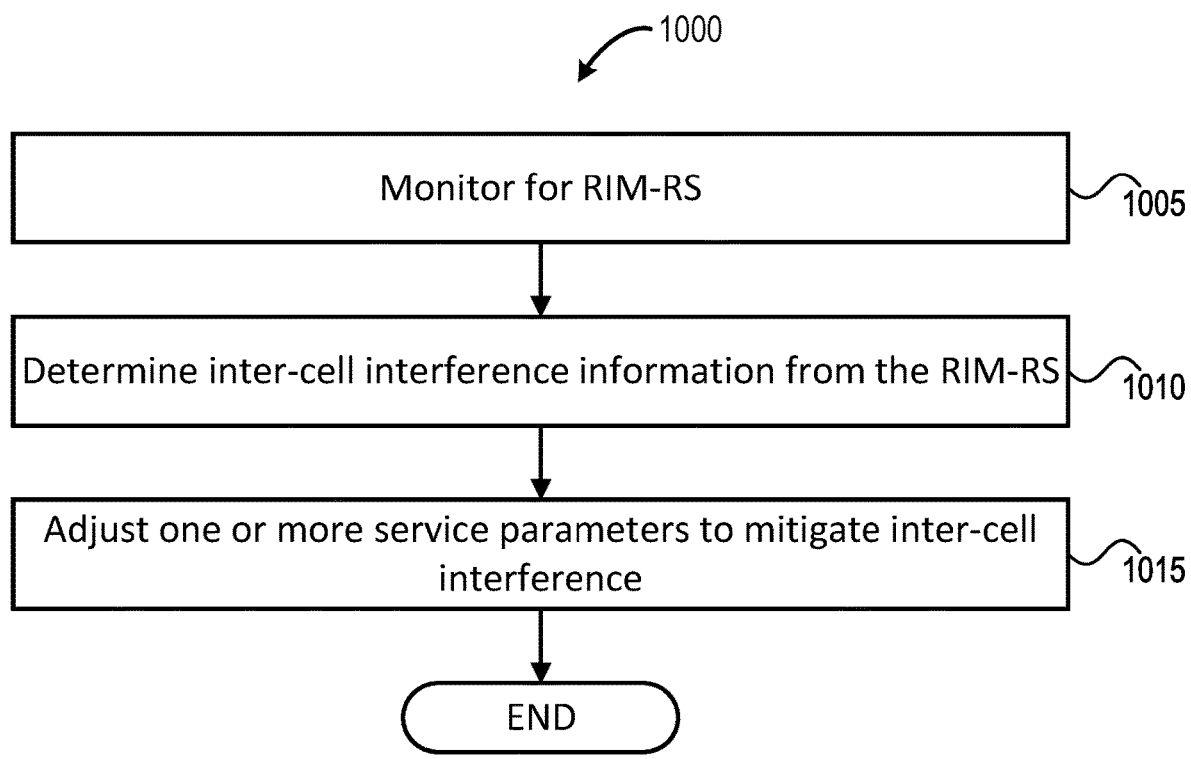

FIGS. 9-10 show example procedures 900-1000, respectively, in accordance with various embodiments. For illustrative purposes, the various operations of processes 900-1000 are described as being performed by elements/entities of FIGS. 1-8. In some embodiments, the processes 900-1000 may be embodied as one or more computer readable storage media comprising program code, instructions, or other like a computer program product (or data to create the computer program product), which is to cause the baseband circuitry and/or application circuitry of the RAN node 111 to perform electronic operations and/or to perform the specific sequence or flow of actions described with respect to FIGS. 9-10. While particular examples and orders of operations are illustrated FIGS. 9-10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 9 shows a victim RIM-RS process 900 according to various embodiments. Process 900 begins at operation 905 where a victim RAN node 111 generates an RIM-RS sequence, which may be based on a ZC sequence or a pseudo-random sequence as discussed herein. In embodiments, generating the RIM-RS sequence includes determining a RIM-RS sequence length for the RIM-RS sequence, a starting subcarrier for the RIM-RS, and a starting symbol of a slot in which the RIM-RS is to be transmitted. The RIM-RS sequence length $L_{RIM}$ is a number of consecutive subcarriers (in the frequency domain) in one or more resource blocks and/or resource elements counting from the starting subcarrier $k_1$. At operation 910, the RAN node 111 maps the generated RIM-RS sequence to physical resources, such as one or more resource blocks and/or one or more resource elements. At operation 915, the RAN node 111 generates a time-continuous OFDM baseband signal for the RIM-RS, which may to include a combination of the physical resources to which the RIM-RS sequence is mapped. At operation 920, the RAN node 111, sends the generated time-continuous OFDM baseband signal over a transmit path for transmission to an aggressor RAN node 111. After operation 920, process 900 ends or may repeat as necessary.

FIG. 10 depicts an example aggressor process 1000 according to various embodiments. Process 1000 begins at operation 1005 where an aggressor RAN node 111 monitors (e.g., attempts to decode) an RIM-RS, which may be based on received signaling from a victim RAN node 111. At operation 1010, the aggressor RAN node 111 determines inter-cell interference information from the RIM-RS (e.g., when properly decoded based on the monitoring). At operation 1015, the aggressor RAN node 111 adjusts one or more service parameters to mitigate the inter-cell interference. After operation 1015, process 1000 ends or may repeat as necessary.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method to be performed by a Radio Access Network (RAN) node, the method comprising: generating, by baseband circuitry, a Radio Interference Management Reference Signal (RIM-RS) to provide information about experienced inter-cell interference, the RIM-RS to include a base time domain sequence; and providing, by the baseband circuitry, the generated RIM-RS to a radio front end module (RFEM) via interface circuitry coupling the baseband circuitry to the RFEM for transmission to another RAN node.

Example 2 includes the method of example 1 and/or some other example(s) herein, wherein generating the RIM-RS comprises: generating, by the baseband circuitry, the base time domain sequence; and repeat generating, by the baseband circuitry, the base time domain sequence one or more times.

Example 3 includes the method of example 2 and/or some other example(s) herein, wherein generating the RIM-RS comprises: generating, by the baseband circuitry, the RIM-RS to have a same subcarrier spacing (SCS) as a downlink SCS; or generating, by the baseband circuitry, the RIM-RS to have a fixed SCS that is different than the downlink SCS.

Example 4 includes the method of examples 1-3 and/or some other example(s) herein, wherein the RIM-RS is to further include a gap period (GP) and transmission of the RIM-RS is to take place at a time location before a maximum downlink transmission boundary within a Time Division Duplex (TDD) downlink (DL) and/or uplink (UL) period.

Example 5 includes the method of examples 1-4 and/or some other example(s) herein, wherein the RIM-RS is to further include a cyclic prefix (CP) having a CP length based on a subcarrier spacing configuration.

Example 6 includes the method of example 5 and/or some other example(s) herein, wherein the CP length is 4.7 microseconds (μs) for a 15 kilohertz (kHz) subcarrier spacing (SCS) or the CP length is 9.4 μs for a 15 kHz SCS.

Example 7 includes the method of examples 1-6 and/or some other example(s) herein, wherein generating the RIM-RS comprises: multiplexing, by the baseband circuitry, one or more component sequences in a frequency domain; and transforming, by the baseband circuitry, the multiplexed component sequences into the base time domain sequence.

Example 8 includes the method of example 7 and/or some other example(s) herein, wherein each component sequence of the one or more component sequences is a Zadoff-Chu (ZC) sequence and wherein generating the RIM-RS further comprises: generating, by the baseband circuitry, each component sequence according to:

$$x_u(n) = \exp\left(-\frac{j\pi u n(n+1)}{N_{ZC}}\right),$$

wherein $x_u(n)$ is the component sequence, n is a number of the one or more component sequences numbered from zero to $N_{ZC}-1$, u is a root index where $u \in \{1, \ldots, N_{ZC}-1\}$, and $N_{ZC}$ is a length of the component sequence and is a largest prime number that is less than or equal to a minimum system bandwidth.

Example 9 includes the method of example 8 and/or some other example(s) herein, wherein each component sequence have a same root index, or at least one component sequence of the one or more component sequences has a different root index than another root index of another component sequence of the one or more component sequences.

Example 10 includes the method of example 7 and/or some other example(s) herein, wherein each component sequence of the one or more component sequences is a pseudo-noise (PN) sequence and generating the RIM-RS comprises: generating, by the baseband circuitry, each component sequence according to:

$$r(n) = \frac{1}{\sqrt{2}}(1 - 2c(2n)) + j\frac{1}{\sqrt{2}}(1 - 2c(2n+1)),$$

wherein r(n) is the component sequence, n is a number of the one or more component sequences numbered from zero to $M_{PN}-1$, $M_{PN}$ is a length of the component sequence is less than or equal to a minimum system bandwidth, and c(n) is a length-31 Gold sequence of length $M_{PN}$.

Example 11 includes the method of example 10 and/or some other example(s) herein, wherein the PN sequence c(n) is an order-31 (or length-31) Gold sequence of length $M_{PN}$, where n=0, 1, ..., $M_{PN}-1$, is defined by: $c(n)=(x_1(n+N_C)+x_2(n+N_C))\mod 2$, $x_1(n+31)=(x_1(n+3)+x_1(n))\mod 2$, $x_2(n+31)=(x_2(n+3)+x_2(n+2)+x_2(n+1)+x_2(n))\mod 2$, wherein $N_C=1600$, $x_1(n)$ is a first m-sequence of the Gold sequence and is initialized with $x_1(0)=1$, $x_1(n)=0$, n=1, 2, ..., 30, $x_2(n)$ is a second m-sequence of the Gold sequence denoted as $c_{init}=\Sigma_{i=0}^{30} x_2(i) \cdot 2^i$ wherein $c_{init}$ is an initial seed value for the second m-sequence $x_2(n)$.

Example 12 includes the method of example 11 and/or some other example(s) herein, wherein $c_{init}=(2^{10}f(n_t^{RIM})+n_{SCID}) \mod 2^{31}$, wherein $n_{SCID}$ is a scrambling identity; $n_t^{RIM}$ is a number of RIM-RS transmission periods; and $f(n_t^{RIM})=\Sigma_{i=0}^{20} 2^i \bar{c}(i)$ where $\bar{c}(i)$ is a base pseudo-random sequence initialized with $\bar{c}_{init}(i)=(\gamma n_t^{RIM}+\delta) \mod 2^{31}$ where $\gamma$ is a multiplier factor and $\delta$ is an offset.

Example 13 includes a method for generating a Radio Interference Management Reference Signal (RIM-RS) by a Radio Access Network (RAN) node, the method comprising: generating or causing to generate an RIM-RS sequence based on a pseudo-random sequence; mapping or causing to map the generated RIM-RS sequence to one or more resource blocks; and generating or causing to generate a time-continuous Orthogonal Frequency Division Multiplexing (OFDM) baseband signal for the RIM-RS, the time continuous OFDM baseband signal to include a combination of the one or more resource blocks to which the RIM-RS sequence is mapped.

Example 14 include the method of example 13 and/or some other example(s) herein, wherein each component sequence of the one or more component sequences is a pseudo-noise (PN) sequence and generating the RIM-RS comprises: generating or causing to generate each component sequence according to:

$$r(n) = \frac{1}{\sqrt{2}}(1 - 2c(2n)) + j\frac{1}{\sqrt{2}}(1 - 2c(2n+1)),$$

wherein r(n) is the component sequence, n is a number of the one or more component sequences numbered from zero to $M_{PN}-1$, $M_{PN}$ is a length of the component sequence is less than or equal to a minimum system bandwidth, and c(n) is a length-31 Gold sequence of length $M_{PN}$.

Example 15 include the method of example 14 and/or some other example(s) herein, wherein the PN sequence c(n) is an order-31 (or length-31) Gold sequence of length $M_{PN}$, where n=0, 1, . . . , $M_{PN}-1$, is defined by: $c(n)=(x_1(n+N_C)+x_2(n+N_C))$mod 2, $x_1(n+31)=(x_1(n+3)+x_1(n))$mod 2, $x_2(n+31)=(x_2(n+3)+x_2(n+2)+x_2(n+1)+x_2(n))$mod 2, wherein $N_C=1600$, $x_1(n)$ is a first m-sequence of the Gold sequence and is initialized with $x_1(0)=1$, $x_1(n)=0$, n=1, 2, . . . , 30, $x_2(n)$ is a second m-sequence of the Gold sequence denoted as $c_{init}=\Sigma_{i=0}^{30} x_2(i) \cdot 2^i$ wherein $c_{init}$ is an initial seed value for the second m-sequence $x_2(n)$.

Example 16 include the method of example 15 and/or some other example(s) herein, wherein $c_{init}=(2^{10}f(n_t^{RIM})+n_{SCID})$ mod $2^{31}$, wherein $n_{SCID}$ is a scrambling identity; $n_t^{RIM}$ is a number of RIM-RS transmission periods; and $f(n_t^{RIM})=\Sigma_{i=0}^{20} 2^i \bar{c}(i)$ where $\bar{c}(i)$ is a base pseudo-random sequence initialized with $\bar{c}_{init}(i)=(\gamma n_t^{RIM}+\delta)$ mod $2^{31}$ where $\gamma$ is a multiplier factor and $\delta$ is an offset.

Example 17 include the method of examples 13-16 and/or some other example(s) herein, wherein mapping the generated RIM-RS sequence to the one or more resource blocks comprises: mapping or causing to map, in a frequency domain, the RIM-RS sequence to one or more consecutive subcarriers; and mapping or causing to map, in a time domain, the RIM-RS sequence to a position before a common downlink transmission boundary.

Example 18 include the method of example 17 and/or some other example(s) herein, wherein mapping the generated RIM-RS sequence to the one or more resource blocks comprises: determining or causing to determine a RIM-RS sequence length of the RIM-RS sequence, a starting subcarrier and a starting symbol of a slot in which the RIM-RS is to be transmitted, wherein the RIM-RS sequence length is a number of consecutive subcarriers in the one or more resource blocks counting from the starting subcarrier.

Example 19 include the method of example 18 and/or some other example(s) herein, wherein generating the time continuous OFDM baseband signal comprises: generate the time continuous OFDM baseband signal to include a cyclic prefix (CP) having a CP length based on a subcarrier spacing configuration.

Example 20 includes a method to be performed by an aggressor Radio Access Network (RAN) node, the method comprising: receiving a Radio Interference Management Reference Signal (RIM-RS) from a victim RAN node; determining information about inter-cell interference experienced by the victim RAN node based on the received RIM-RS; and adjusting one or more radiofrequency parameters based on the determined information to mitigate the inter-cell interference experienced by the victim RAN node.

Example 21 includes the method of example 20 and/or some other example(s) herein, further comprising: detecting the RIM-RS during one or more detection windows, each of the one or more detection windows having a length of one time domain symbol, and wherein a RIM-RS sequence of the RIM-RS is repeated in each of the one or more detection windows.

Example 22 includes the method of example 21 and/or some other example(s) herein, wherein, for detecting the RIM-RS during the one or more detection windows, the processing means is further for monitoring for the RIM-RS at a time location before a downlink transmission boundary.

Example 23 includes the method of examples 21-22 and/or some other example(s) herein, wherein the RIM-RS sequence is based on a pseudo-random sequence, wherein the pseudo-random sequence is a length-31 Gold sequence.

Example 24 includes the method of example 23 and/or some other example(s) herein, wherein detecting the RIM-RS during the one or more detection windows comprises: attempting detection of, or attempting to decode, only a portion of the RIM-RS sequence in a portion of a total system bandwidth assigned to the aggressor RAN node.

Example 25 includes the method of examples 20-24 and/or some other example(s) herein, wherein the determined information includes a number of uplink resources of the victim RAN node impacted by the inter-cell interference.

Example 26 may include an apparatus comprising means to perform one or more elements of a method described in or related to any of examples 1-25, or any other method or process described herein. Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein. Example 28 may include an apparatus comprising logic, modules, or circuitry to perform one or more elements of a method described in or related to any of examples 1-25, or any other method or process described herein. Example 29 may include a method, technique, or process as described in or related to any of examples 1-25, or portions or parts thereof. Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof. Example 31 may include a signal as described in or related to any of examples 1-25, or portions or parts thereof. Example 32 may include a datagram, packet, frame, segment, protocol data unit (PDU), or message as described in or related to any of examples 1-25, or portions or parts thereof, or otherwise described in the present disclosure. Example 33 may include a signal encoded with data as described in or related to any of examples 1-25, or portions or parts thereof, or otherwise described in the present disclosure. Example 34 may include a signal encoded with a datagram, packet, frame, segment, protocol data unit (PDU), or message as described in or related to any of examples 1-25, or portions or parts thereof, or otherwise described in the present disclosure. Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof. Example 36 may include a computer program comprising instructions, wherein execution of the program by a processing element is to cause the processing element to carry out the method, techniques, or process as described in or related to any of examples 1-25, or portions thereof. Example 37 may include a signal in a wireless network as shown and described herein. Example 38 may include a method of communicating in a wireless network as shown and described herein. Example 39 may include a system for providing wireless communication as shown and described herein. Example 40 may include a device for providing wireless communication as shown and described herein.

Any of the above-described examples may be combined with any other example (or combination of examples), unless explicitly stated otherwise. The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. The term "coupled" (or variants thereof) may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "communicatively coupled" may mean that two or more elements may be in contact with one another by a means of communication including through a wire or other interconnect connection, through a wireless communication channel or ink, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A base station (BS) comprising:
   a radio front end circuitry; and
   baseband circuitry coupled to the radio front end circuitry, the baseband circuitry configured to:
   generate a Radio Interference Management Reference Signal (RIM-RS), wherein the RIM-RS comprises information about experienced inter-cell interference and a base time domain sequence, including
   multiplex one or more component sequences in a frequency domain, wherein a length of a component sequence of the one or more component sequences is less than or equal to a minimum system bandwidth; and
   transform the multiplexed component sequences into the base time domain sequence; and
   transmit, via the front end circuitry, the RIM-RS to another BS.

2. The BS of claim 1, wherein, to generate the RIM-RS, the baseband circuitry is configured to:
   generate the base time domain sequence; and
   repeat the generation of the base time domain sequence one or more times.

3. The BS of claim 2, wherein, to generate the RIM-RS, the baseband circuitry is configured to:
   generate the RIM-RS to have a same subcarrier spacing (SCS) as a downlink SCS; or
   generate the RIM-RS to have a fixed SCS that is different than the downlink SCS.

4. The BS of claim 1, wherein the RIM-RS comprises a gap period (GP), and the transmission of the RIM-RS occurs at a time location before a maximum downlink transmission boundary within a Time Division Duplex (TDD) downlink (DL) or uplink (UL) period.

5. The BS of claim 1, wherein the RIM-RS comprises a cyclic prefix (CP), comprising a CP length based on a subcarrier spacing (SCS) configuration.

6. The BS of claim 5, wherein the CP length is 4.7 us for a 15 SCS, or the CP length is 9.4 μs for a 15 kHz SCS.

7. The BS of claim 1, wherein the component sequence of the one or more component sequences is a Zadoff-Chu (ZC) sequence, to generate the RIM-RS, the baseband circuitry is configured to:
   generate the component sequence according to, $$x_u(n) = \exp\left(-\frac{j\pi un(n+1)}{N_{ZC}}\right)$$

wherein $x_u(n)$ is the component sequence, n is a number of the one or more component sequences numbered from zero to $N_{ZC}-1$, u is a root index where $u \in \{1, \ldots, N_{ZC}-1\}$, and $N_{ZC}$ is the length of the component sequence and is a largest prime number that is less than or equal to the minimum system bandwidth.

8. The BS of claim 7, wherein a first and a second component sequence of the one or more component sequences have a same root index, or the first component sequence has a different root index than the second component sequence.

9. The BS of claim 1, wherein the component sequence of the one or more component sequences comprises a pseudo-noise (PN) sequence and, to generate the RIM-RS, the baseband circuitry is configured to:
   generate the component sequence according to, $$r(n) = \frac{1}{\sqrt{2}}(1 - 2c(2n)) + j\frac{1}{\sqrt{2}}(1 - 2c(2n+1))$$

wherein r(n) is the component sequence, n is a number of the one or more component sequences numbered from zero to $M_{PN}-1$, $M_{PN}$ is the length of the component sequence and is less than or equal to the minimum system bandwidth, and c(n) is a length-31 Gold sequence of length $M_{PN}$.

10. The BS of claim 9, wherein the PN sequence c(n) is an order-31 (or length-31) Gold sequence of length $M_{PN}$, where n=0,1, . . . , $M_{PN}$−1, is defined by:

$$c(n)=(x_1(n+N_C)+x_2(n+N_C))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2$$

wherein $N_C$=1600, $x_1(n)$ is a first m-sequence of the Gold sequence and is initialized with $x_1(0)$=1, $x_1(n)$=0, n=1, 2, . . . ,30, $x_2(n)$ is a second m-sequence of the Gold sequence denoted as $c_{init}=\Sigma_{i=0}^{30} x_2(i) \cdot 2^i$ wherein $c_{init}$ is an initial seed value for the second m-sequence $x_2(n)$.

11. The BS of claim 9, wherein $c_{init}=(2^{10} f(n_t^{RIM})+n_{SCID})$ mod $2^{31}$ wherein $n_{SCID}$ is a scrambling identity; $n_t^{RIM}$ is a number of RIM-RS transmission periods; and
$f(n_t^{RIM})=\Sigma 2^i \bar{c}(i)$ where $\bar{c}(i)$ is a base pseudo-random sequence initialized with $\bar{C}_{init}(i)=(\gamma n_t^{RIM}+\delta)\mod 2^{31}$ where γ is a multiplier factor and δ is an offset.

12. A method for a base station (BS) comprising:
generating a Radio Interference Management Reference Signal, (RIM-RS), wherein the RIM-RS comprises information about experienced inter-cell interference and a base time domain sequence, including
multiplexing one or more component sequences in a frequency domain, wherein a length of a component sequence of the one or more component sequences is less than or equal to a minimum system bandwidth; and
transforming the multiplexed component sequences into the base time domain sequence; and
transmitting the RIM-RS to an other BS.

13. The method of claim 12, further comprising:
mapping the generated RIM-RS sequence to one or more resource blocks; and
generating a time-continuous Orthogonal Frequency Division Multiplexing (OFDM) baseband signal for the RIM-RS sequence, wherein the time-continuous OFDM baseband signal comprises a combination of the one or more resource blocks to which the RIM-RS sequence is mapped.

14. The method of claim 12, wherein, the generating the RIM-RS comprises:
generating the RIM-RS to have a same subcarrier spacing (SCS), as a downlink SCS; or
generating the RIM-RS to have a fixed SCS that is different than the downlink SCS.

15. The method of claim 12, wherein the RIM-RS comprises a gap period (GP), and the transmitting the RIM-RS occurs at a time location before a maximum downlink transmission boundary within a Time Division Duplex (TDD) downlink (DL) or uplink (UL) period.

16. The method of claim 12, wherein the component sequence of the one or more component sequences is a Zadoff-Chu (ZC) sequence, the generating the RIM-RS operation comprises:
generating the component sequence according to, $$x_u(n) = \exp\left(-\frac{j\pi u n(n+1)}{N_{ZC}}\right)$$

wherein $x_u(n)$ is the component sequence, n is a number of the one or more component sequences numbered from zero to $N_{ZC}$−1, u is a root index where u∈{1, . . . , $N_{ZC}$−1}, and $N_{ZC}$ is the length of the component sequence and is a largest prime number that is less than or equal to the minimum system bandwidth.

17. The method claim 12, wherein the component sequence of the one or more component sequences comprises a pseudo-noise (PN) sequence and, the generating the RIM-RS operation comprises:
generating the component sequence according to, $$r(n) = \frac{1}{\sqrt{2}}(1 - 2c(2n)) + j\frac{1}{\sqrt{2}}(1 - 2c(2n+1))$$

wherein r(n) is the component sequence, n is a number of the one or more component sequences numbered from zero to $M_{PN}$−1, $M_{PN}$ is the length of the component sequence and is less than or equal to the minimum system bandwidth, and c(n) is a length-31 Gold sequence of length $M_{PN}$.

18. A non-transitory computer readable medium (CRM) storing instructions that, when executed by a processor of a base station (BS), cause the BS to perform operations, the operations comprising:
generating a Radio Interference Management Reference Signal (RIM-RS), wherein the RIM-RS comprises information about experienced inter-cell interference and a base time domain sequence, including
multiplexing one or more component sequences in a frequency domain, wherein a length of a component sequence of the one or more component sequences is less than or equal to a minimum system bandwidth; and
transforming the multiplexed component sequences into the base time domain sequence; and
transmitting the RIM-RS to an other BS.

19. The non-transitory CRM of claim 18, wherein the component sequence of the one or more component sequences is a Zadoff-Chu (ZC) sequence, the generating the RIM-RS operation comprises:
generating the component sequence according to, $$x_u(n) = \exp\left(-\frac{j\pi u n(n+1)}{N_{ZC}}\right)$$

wherein $x_u(n)$ is the component sequence, n is a number of the one or more component sequences numbered from zero to $N_{ZC}$−1, u is a root index where u∈{1, . . . , $N_{ZC}$−1}, and $N_{ZC}$ is the length of the component sequence and is a largest prime number that is less than or equal to the minimum system bandwidth.

20. The non-transitory CRM of claim 18, wherein the component sequence of the one or more component sequences comprises a pseudo-noise (PN) sequence and, the generating the RIM-RS operation comprises:
generating the component sequence according to, $$r(n) = \frac{1}{\sqrt{2}}(1 - 2c(2n)) + j\frac{1}{\sqrt{2}}(1 - 2c(2n+1))$$

wherein r(n) is the component sequence, n is a number of the one or more component sequences numbered from zero to $M_{PN}-1$, $M_{PN}$ is the length of the component sequence and is less than or equal to the minimum system bandwidth, and c(n) is a length-31 Gold sequence of length $M_{PN}$.

\* \* \* \* \*